(12) United States Patent
Iqbal et al.

(10) Patent No.: US 11,488,418 B2
(45) Date of Patent: *Nov. 1, 2022

(54) THREE-DIMENSIONAL (3D) POSE ESTIMATION FROM A MONOCULAR CAMERA

(71) Applicant: NVIDIA Corporation, Santa Clara, CA (US)

(72) Inventors: Umar Iqbal, San Jose, CA (US); Pavlo Molchanov, Mountain View, CA (US); Thomas Michael Breuel, Sparks, NV (US); Jan Kautz, Lexington, MA (US)

(73) Assignee: NVIDIA Corporation, Santa Clara, CA (US)

( * ) Notice: Subject to any disclaimer, the term of this patent is extended or adjusted under 35 U.S.C. 154(b) by 133 days.

This patent is subject to a terminal disclaimer.

(21) Appl. No.: 17/135,697

(22) Filed: Dec. 28, 2020

(65) Prior Publication Data

US 2021/0117661 A1    Apr. 22, 2021

Related U.S. Application Data

(63) Continuation of application No. 16/290,643, filed on Mar. 1, 2019, now Pat. No. 10,929,654.

(Continued)

(51) Int. Cl.
*G06V 40/20*    (2022.01)
*G06N 3/08*    (2006.01)
(Continued)

(52) U.S. Cl.
CPC .............. *G06V 40/28* (2022.01); *G06N 3/08* (2013.01); *G06N 5/046* (2013.01); *G06T 7/579* (2017.01); *G06T 7/73* (2017.01); *G06V 40/107* (2022.01)

(58) Field of Classification Search
CPC ...... G06V 40/28; G06V 40/107; G06V 10/82; G06N 3/08; G06N 5/046; G06N 3/0472;
(Continued)

(56) References Cited

U.S. PATENT DOCUMENTS 10,929,654 B2 *    2/2021   Iqbal .................... G06V 40/107

OTHER PUBLICATIONS

U.S. Appl. No. 16/290,643, filed Mar. 1, 2019.
(Continued)

*Primary Examiner* — Phuoc Tran
(74) *Attorney, Agent, or Firm* — Leydig, Voit & Mayer, Ltd.

(57) ABSTRACT

Estimating a three-dimensional (3D) pose of an object, such as a hand or body (human, animal, robot, etc.), from a 2D image is necessary for human-computer interaction. A hand pose can be represented by a set of points in 3D space, called keypoints. Two coordinates (x,y) represent spatial displacement and a third coordinate represents a depth of every point with respect to the camera. A monocular camera is used to capture an image of the 3D pose, but does not capture depth information. A neural network architecture is configured to generate a depth value for each keypoint in the captured image, even when portions of the pose are occluded, or the orientation of the object is ambiguous. Generation of the depth values enables estimation of the 3D pose of the object.

20 Claims, 14 Drawing Sheets

Related U.S. Application Data

(60) Provisional application No. 62/641,510, filed on Mar. 12, 2018.

(51) Int. Cl.
  *G06T 7/73* (2017.01)
  *G06N 5/04* (2006.01)
  *G06T 7/579* (2017.01)
  *G06V 40/10* (2022.01)

(58) Field of Classification Search
  CPC ...... G06N 3/0454; G06N 3/084; G06T 7/579; G06T 7/73; G06T 2200/04; G06T 2207/10028; G06T 2207/20081; G06T 2207/20084; G06T 2207/30196; G06K 9/6271
  See application file for complete search history.

(56) References Cited

OTHER PUBLICATIONS

Panteleris, P., Argyros, A.: Back to RGB: 3D tracking of hands and hand-object interactions based on short-baseline stereo. In: arXiv preprint arXiv:1705.05301. In: (2017) 1.

Sun, X., Shang, J., Liang, S., Wei, Y.: Compositional human pose regression. In: ICCV. (2017) 2, 3, 10, 15.

Pavlakos, G., Zhou, X., Derpanis, K.G., Daniilidis, K.: Coarse-to-fine volumetric prediction for single-image 3D human pose. In: CVPR. (2017) 2, 3, 4, 7.

Panteleris, P., Oikonomidis, I., Argyros, A.: Using a single RGB frame for real-time 3D hand pose estimation in the wild. In: WACV. (2018) 2.

Tome, D., Russell, C., Agapito, L.: Lifting from the deep: Convolutional 3D pose estimation from a single image. In: CVPR. (2017) 3.

Moreno-Noguer, F.: 3D human pose estimation from a single image via distance matrix regression. In: CVPR. (2017) 3.

Martinez, J., Hossain, R., Romero, J., Little, J.J.: A simple yet effective baseline for 3D human pose estimation. In: ICCV. (2017) 3.

Zimmermann, C., Brox, T.: Learning to estimate 3D hand pose from single RGB images. In: ICCV. (2017) 3, 9, 10, 11, 12, 13.

Tekin, B., Marquez-Neila, P., Salzmann, M., Fua, P.: Learning to fuse 2D and 3D image cues for monocular body pose estimation. In: ICCV. (2017) 3.

Li, S., Chan, A.B.: 3D human pose estimation from monocular images with deep convolutional neural network. In: ACCV. (2014) 3.

Zhou, X., Sun, X., Zhang, W., Liang, S., Wei, Y.: Deep kinematic pose regression. In: ECCV Workshops. (2016) 3.

Mueller, F., Bernard, F., Sotnychenko, O., Mehta, D., Sridhar, S., Casas, D., Theobalt, C.: GANerated hands for real-time 3D hand tracking from monocular RGB. In: CVPR. (2018) 3, 10, 12, 13.

Popa, A., Zanr, M., Sminchisescu, C.: Deep multitask architecture for integrated 2D and 3D human sensing. In: CVPR. (2017) 3.

Zhou, X., Huang, Q., Sun, X., Xue, X., Wei, Y.: Weakly-supervised transfer for 3D human pose estimation in the wild. In: ICCV. (2017) 3.

Nie, B.X., Wei, P., Zhu, S.C.: Monocular 3D human pose estimation by predicting depth on joints. In: ICCV. (2017) 3, 4.

Simon, T., Joo, H., Matthews, I., Sheikh, Y.: Hand keypoint detection in single images using multiview bootstrapping. In: CVPR. (2017) 7, 9, 10, 11, 13.

Mueller, F., Mehta, D., Sotnychenko, O., Sridhar, S., Casas, D., Theobalt, C.: Real-time hand tracking under occlusion from an egocentric RGB-D sensor. In: ICCV. (2017) 9, 16.

Nathan Silberman, Derek Hoiem, P.K., Fergus, R.: Indoor segmentation and support inference from RGBD images. In: ECCV. (2012) 9.

\* cited by examiner

THREE-DIMENSIONAL (3D) POSE ESTIMATION FROM A MONOCULAR CAMERA

CLAIM OF PRIORITY

This application is a continuation of U.S. application Ser. No. 16/290,643 titled "Three-Dimensional (3D) Pose Estimation from a Monocular Camera," filed Mar. 1, 2019 that claims the benefit of U.S. Provisional Application No. 62/641,510 titled "System and Methods for 3D hand Pose Estimation from Monocular Camera," filed Mar. 12, 2018, the entire contents of which is incorporated herein by reference.

TECHNICAL FIELD

The present disclosure relates to pose estimation, and more specifically to estimating a 3D pose of an object using a neural network.

BACKGROUND

Estimating a 3D pose of an object, such as a hand or body (human, animal, robot, etc.), from a 2D image is useful for human-computer interaction. Hand pose can be represented by a fixed set of points in 3D space, usually joints, called landmarks or keypoints. Estimating the 3D pose accurately is a difficult task due to the large amounts of appearance variation, self-occlusions, and complexity of articulated hand poses. 3D hand pose estimation escalates the difficulties even further because a depth of each of the hand keypoints also has to be estimated.

Conventional techniques for determining locations of the landmarks of a hand in 3D space include one or more of multi-view camera systems, depth sensors, and color markers/gloves. Each of the conventional techniques requires a constrained environment and/or specialized equipment. Furthermore, environmental conditions such as sunlight, occlusions, and complexity of non-rigid hand poses present challenges to landmark detection and determination. There is a need for addressing these issues and/or other issues associated with the prior art.

SUMMARY

Estimating a three-dimensional (3D) pose of an object from a 2D image can be implemented using deep learning. A hand pose is represented by a set of points in 3D space, called keypoints. Two coordinates (x,y) represent spatial displacement in the 2D image and a third coordinate represents the depth of every point with respect to the camera. A monocular camera may be used to capture an image of the 3D pose, but does not capture depth information. A neural network architecture learns to generate a depth value for each keypoint in the captured image, even when portions of the pose are occluded, or the orientation of the object is ambiguous. Generation of the depth values enables estimation of the 3D pose of the object.

A method, computer readable medium, and system are disclosed for estimating a 3D pose of an object. The system receives locations of keypoints for a 3D object, where each location includes pixel coordinates and a normalized depth value, the pixel coordinates corresponding to pixels within a two-dimensional (2D) image of the 3D object, the 2D image associated with camera attributes. The system computes a scale normalized 3D pose of the 3D object based on the locations and the camera attributes and generates an absolute 3D pose of the 3D object from the scale normalized 3D pose according to a scale factor.

A method, computer readable medium, and system are disclosed for estimating a 2.5D location of a keypoint from a 2D image using a neural network model. The neural network model processes a 2D image of a 3D object according to a set of parameters to produce latent depth data corresponding to the keypoint associated with the 3D object. Latent pixel coordinate data corresponding to the keypoint is obtained and the system computes, based on the latent depth data and the latent pixel coordinate data, a depth value for the keypoint. The system converts the latent pixel coordinate data into a pixel coordinate location for the keypoint.

DETAILED DESCRIPTION

A deep neural network-based system is described for estimating a 3D pose of an object from an image captured by a monocular camera. In the context of the following description, the object may be any object represented by a structural skeletal model, including a human hand, entire human body, robot, or the like. In the context of the following description, a structural skeletal model is a collection of keypoints or vertices and/or edges/lines connecting the keypoints or vertices that represent structural components of an object's skeleton, such as the bones in a hand.

Estimating the 3D pose from an image of the object captured by a monocular camera is an ill-posed problem due to scale and depth ambiguities. Attempting to estimate the 3D pose using conventional techniques may not work at all or may result in over-fitting to a very specific environment and subjects.

Estimating the 3D pose is therefore performed by decomposing the problem into two subproblems both of which can be solved without ambiguities. First, a 2.5D pose representation is estimated from the image and then the 3D pose is reconstructed from the 2.5D pose representation. In an embodiment, a neural network model learns to generate a 2.5D pose representation. The 2.5D representation is scale and translation invariant and can be estimated from RGB images. The 2.5D pose representation includes 2D coordinates of the object keypoints in the input image and a scale normalized depth for each keypoint. In an embodiment, 3D coordinates of object keypoints are estimated relative to the camera position. Importantly, scale normalization of the depth values is performed such that one of the components (e.g., bone) of the structural skeletal model of the object has a fixed length in 3D space. Such a constrained normalization allows direct reconstruction of the scale normalized absolute 3D pose.

Figure 1A:
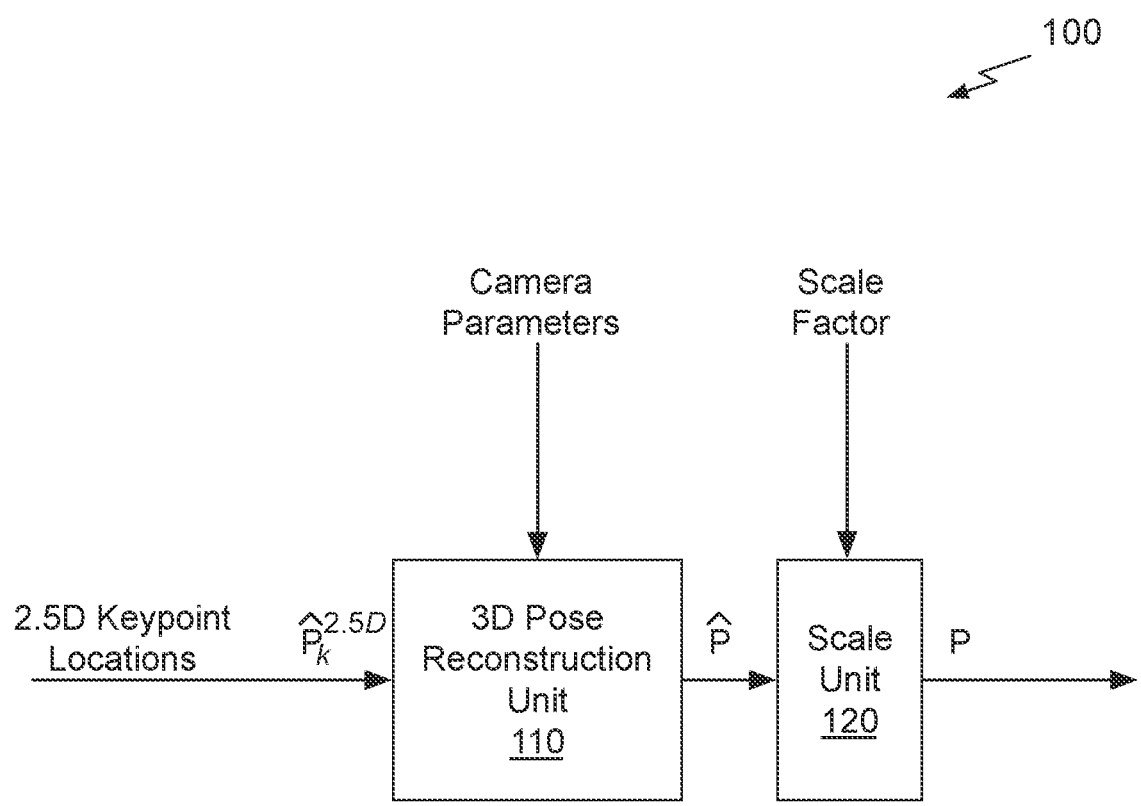
FIG. 1A illustrates a block diagram of a 3D pose reconstruction system, in accordance with an embodiment.

FIG. 1A illustrates a block diagram of a 3D pose reconstruction system 100, in accordance with an embodiment. The 3D pose reconstruction system 100 comprises a 3D pose reconstruction unit 110 and a scale unit 120. The 3D pose reconstruction unit 110 receives the 2.5D pose representation encoded as 2.5D keypoint locations. In an embodiment, the 2.5D keypoint locations are generated using a neural network model, such as the neural network model 210 or 212 shown in FIG. 2A or 2C, respectively. The 2.5D keypoint locations ($\hat{P}_k^{2.5D}$) include three components for each keypoint, namely, pixel coordinates ($x_k$, $y_k$) and scale normalized depth values ($\hat{Z}_k^r$), where k is the keypoint and r is a root or reference keypoint.

In an embodiment, the depth values are determined relative to a reference keypoint. For example, in an embodiment where the 3D pose reconstruction unit 110 is configured for estimating the pose of a hand, the reference keypoint is located on the palm of the hand. The reference keypoint can be chosen to be any keypoint as a function of the object's skeleton model. Importantly, the depth values are normalized according to a scale of the 3D object. The 2.5D keypoint locations are translation and scale invariant. In an embodiment, when the object is a hand, the depth values are normalized based on a scale factor equal to a distance between the first joint of the index finger and palm of the hand. The scale factor can be any distance function of the 3D object's skeleton model that remains constant during articulations.

The 3D pose reconstruction unit 110 calculates the normalized 3D pose based on the 2.5D keypoint locations and intrinsic parameters of the monocular camera corresponding to the captured image of the object. In an embodiment, the 3D pose reconstruction unit 110 provides an exact solution to obtain the absolute 3D pose up to a scale factor. The full absolute 3D pose can be recovered by knowing the measured length of the component of the object's structural skeletal model or using optimization under assumption of prior component length distribution. Given the normalized 3D pose $\hat{P}$, the scale unit 120 computes the absolute 3D pose, P using the scale factor. In contrast with conventional techniques, the ground-truth 3D location of the root joint is not needed to compute the absolute 3D pose. In an embodiment, rather than requiring a global scale of the object, the global scale of the object is approximated.

Although the 3D pose reconstruction system 100 is described in the context of processing units, one or more of the units, including either or both of the 3D pose reconstruction unit 110 and the scale unit 120, may be implemented as a program, custom circuitry, or by a combination of custom circuitry and a program. For example, the 3D pose reconstruction unit 110 and/or the scale unit 120 may be implemented by a GPU (graphics processing unit), CPU (central processing unit), or any processor capable of performing the operations of the 3D pose reconstruction unit 110 and/or the scale unit 120. Furthermore, persons of ordinary skill in the art will understand that any system that performs the operations of the 3D pose reconstruction system 100 is within the scope and spirit of embodiments of the present disclosure.

More illustrative information will now be set forth regarding various optional architectures and features with which the foregoing framework may be implemented, per the desires of the user. It should be strongly noted that the following information is set forth for illustrative purposes and should not be construed as limiting in any manner. Any of the following features may be optionally incorporated with or without the exclusion of other features described.

Although the following description uses an example of a hand as an object for which the pose is estimated, the techniques may be applied to other 3D objects. Given an RGB image I of a hand, the goal is to estimate the 2D and 3D positions of K keypoints of the hand. The 2D hand pose is defined as $p=\{p_k\}_{k \in K}$ and the 3D pose is defined as $P=\{P_k\}_{k \in K}$ where $p_k=(x_k, y_k) \in \mathbb{R}^2$ represents the 2D pixel coordinates of the keypoint k in image I and $P_k=(X_k, Y_k, Z_k) \in \mathbb{R}^3$ denotes the location of the keypoint in the 3D camera coordinate frame measured in millimeters. The Z-axis corresponds to the optical axis. Given the intrinsic camera parameters $\mathcal{K}$, the relationship between the 3D location $P_k$ and corresponding 2D projection $p_k$ can be written as follows under a perspective projection:

$$Z_k \begin{pmatrix} x_k \\ y_k \\ 1 \end{pmatrix} = \mathcal{K} \begin{pmatrix} X_k \\ Y_k \\ Z_k \\ 1 \end{pmatrix} = \mathcal{K} \begin{pmatrix} X_k \\ Y_k \\ Z_{root} + Z_k^r \\ 1 \end{pmatrix} \quad k \in 1, \ldots K \quad (1)$$

where $k \in 1, \ldots K$, $Z_{root}$ is the depth of the root keypoint, and $Z_k^r = Z_k - Z_{root}$ corresponds to the depth of the $k^{th}$ keypoint relative to the root keypoint. In an embodiment, the palm of the hand is used as the root keypoint. Given an image I, a function $\mathcal{F}$ is needed, such that $\mathcal{F}: I \rightarrow P$, and the estimated 3D hand pose P can be projected to 2D with the camera parameter $\mathcal{K}$.

However, predicting the absolute 3D hand pose in camera coordinates is infeasible due to irreversible geometry and scale ambiguities. Examples of an irreversible geometry ambiguity is a hand that is positioned horizontal relative to the camera and appears similar when the palm is closes to the camera with the fingers pointing directly away from the camera as the hand appears when the fingers are pointing directly towards the camera and the palm is furthest from the camera. Examples of scale ambiguities result from the inability to distinguish a large object that is far from the camera from a small object that is close to the camera. Therefore, a 2.5D pose representation is chosen which can be recovered from a 2D image and provide a solution to recover the 3D pose from the 2.5D representation. The 2.5D pose is defined as $P_k^{2.5D} = \{P_k^{2.5D}\}_{k \in K}$, where $P_k^{2.5D} = (x_k, y_k, Z_k^r)$. The coordinates $x_k$ and $y_k$ are the image pixel coordinates of the $k^{th}$ keypoint and $Z_k^r$ is the $k^{th}$ keypoint's metric depth relative to the root keypoint. The coordinates $P_k^{2.5D} = (x_k, y_k, Z_k^r)$ comprise the 2.5D keypoint locations that are received by the 3D pose reconstruction unit 110. Importantly, the 2.5D keypoint locations are translation invariant.

In order to remove the scale ambiguities, the 3D pose is scale-normalized as follows:

$$\hat{P} = \frac{C}{s} \cdot P \quad (2)$$

where $s = \|P_n - P_{parent(n)}\|_2$ is computed for each 3D pose independently. This results in a normalized 3D pose $\hat{P}$ with a constant distance C between a specific pair of keypoints (n, parent(n)). Subsequently, the normalized 2.5D representation for keypoint k becomes $\hat{P}_k^{2.5D} = (x_k, y_k, \hat{Z}_k^r)$, which is both scale and translation invariant. Note that the 2D pose does not change due to the normalization, since the projection of the 3D pose remains the same. Such a normalized 2.5D representation has several advantages: image information may be effectively exploited; dense pixel-wise prediction is possible; multiple sources of training data can be used for multi-task learning by a neural network model; and finally, an approach to recover the absolute 3D pose P up to a scale factor may be used. More specifically, the 3D pose reconstruction system 100 may be used to reconstruct the 3D pose from the normalized 2.5D representation of the pose.

Figure 1B:
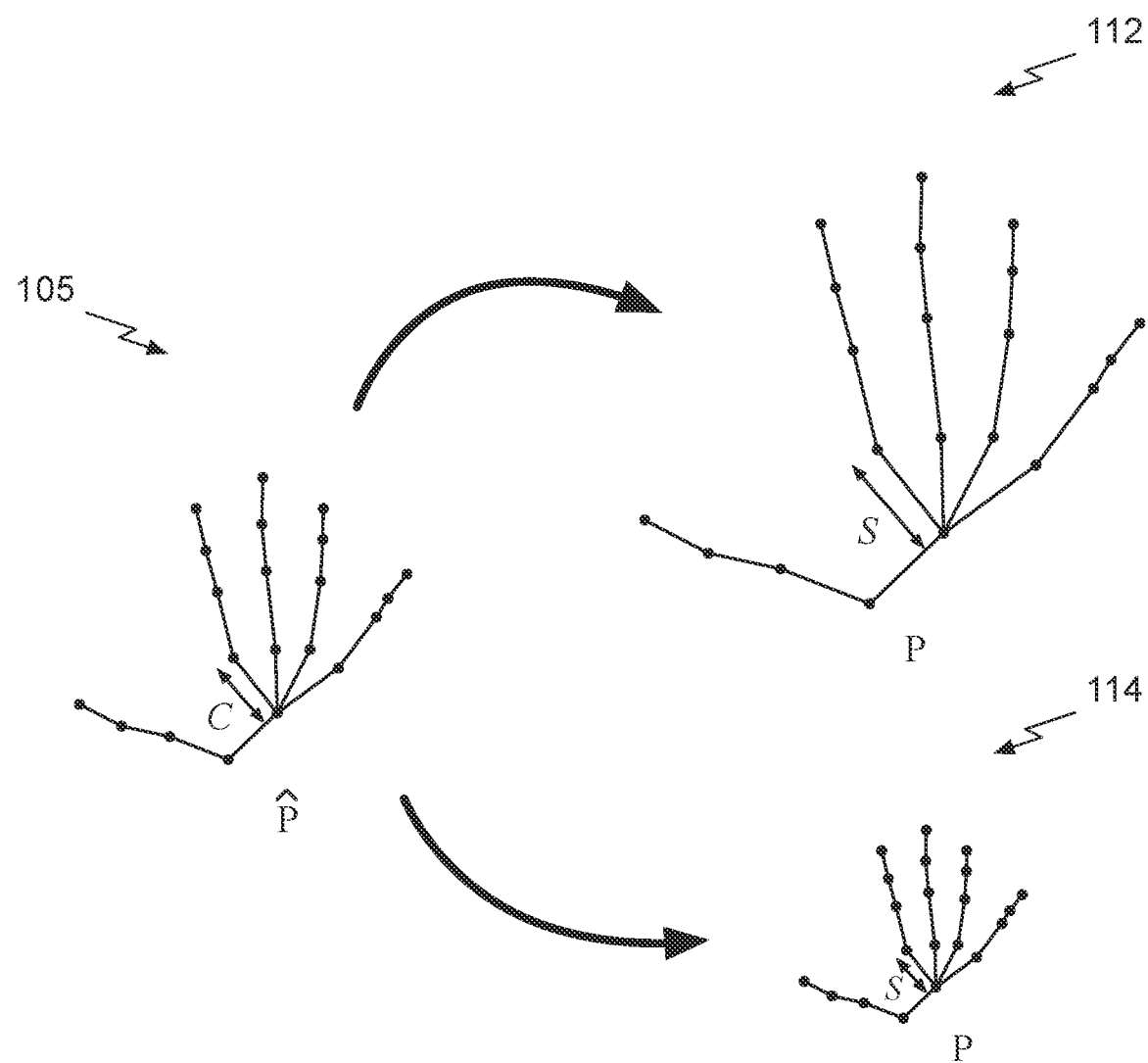
FIG. 1B illustrates a conceptual diagram of a scaled pose, in accordance with an embodiment.

FIG. 1B illustrates a conceptual diagram of a scaled pose, in accordance with an embodiment. In one embodiment, a scaled pose refers to a scale normalized pose 105 of a hand having a length C for a bone between a pair of keypoints n and m. The scale normalized pose 105 is defined by 2.5D keypoint locations that, when processed by the 3D pose reconstruction unit 110 produces a scale normalized 3D pose $\hat{P}$. The scale unit 120 then scales the scale normalized 3D pose $\hat{P}$ according to the scale factor defined in Equation (2) to restore the object scale, restoring the absolute 3D pose P. As shown in FIG. 1B, the restored absolute 3D pose 112 is larger compared with the scale normalized 3D pose 105 for the same object, such that S>C. Conversely, the restored absolute 3D pose 114 is smaller compared with the scale normalized 3D pose 105 for the same object, such that S<C. In an embodiment, the restored absolute 3D pose is the same as the scale normalized 3D pose 105.

Figure 2A:
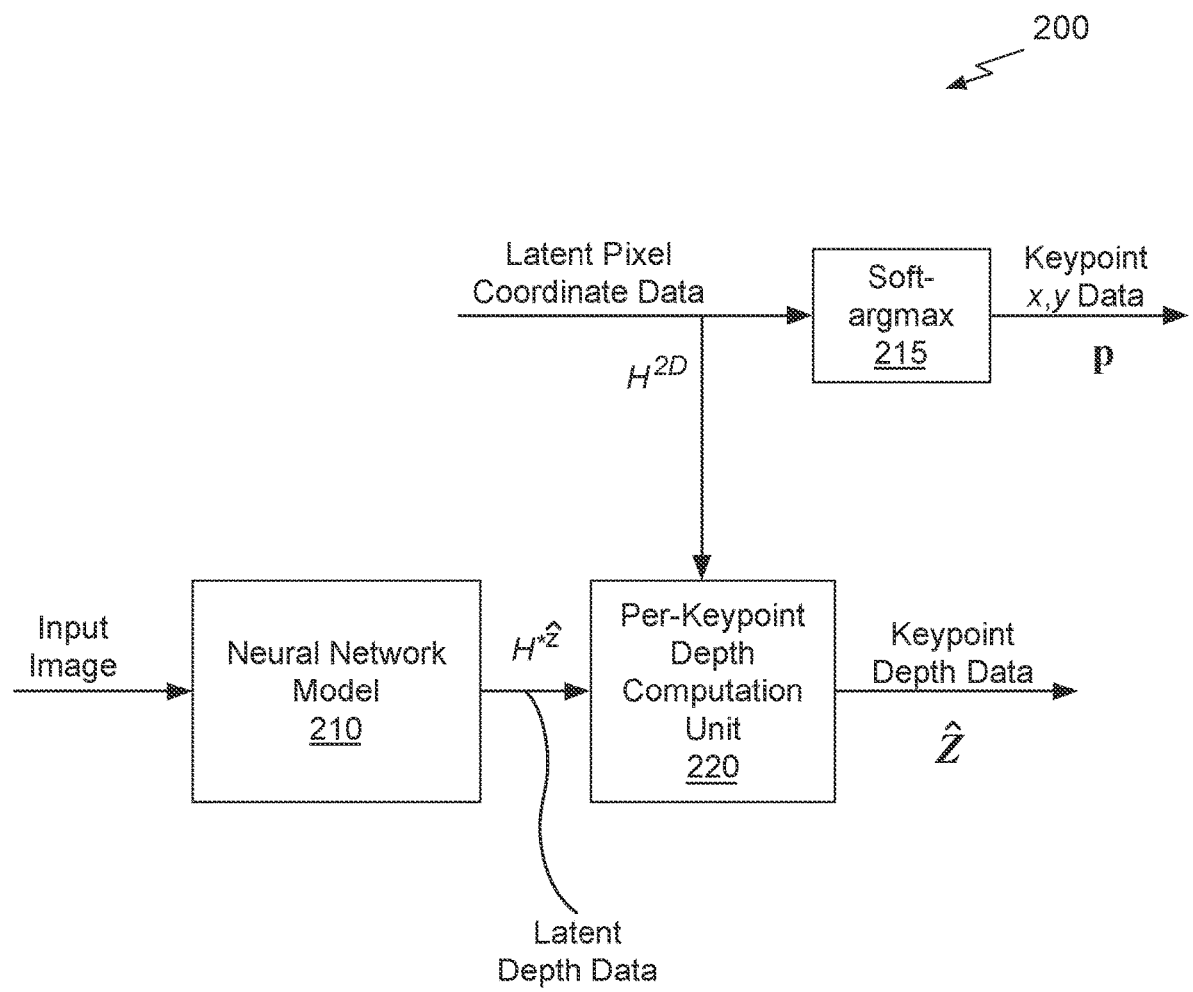
FIG. 2A illustrates a block diagram of a 2.5D keypoint estimation system, in accordance with an embodiment.

As described in conjunction with FIG. 2A, a 2.5D keypoint estimation system 200, may estimate the normalized 2.5D representation of the pose given an input image using a neural network model. In contrast, conventional techniques rely on data driven approaches that learn the scale of the hand for all particular viewpoints and suffer from generalization to unseen subjects. Normalizing the scale by using the scale normalized 2.5D representation, improves accuracy of the neural network model and enables generalization to poses that were not included in a training dataset.

Figure 1C:
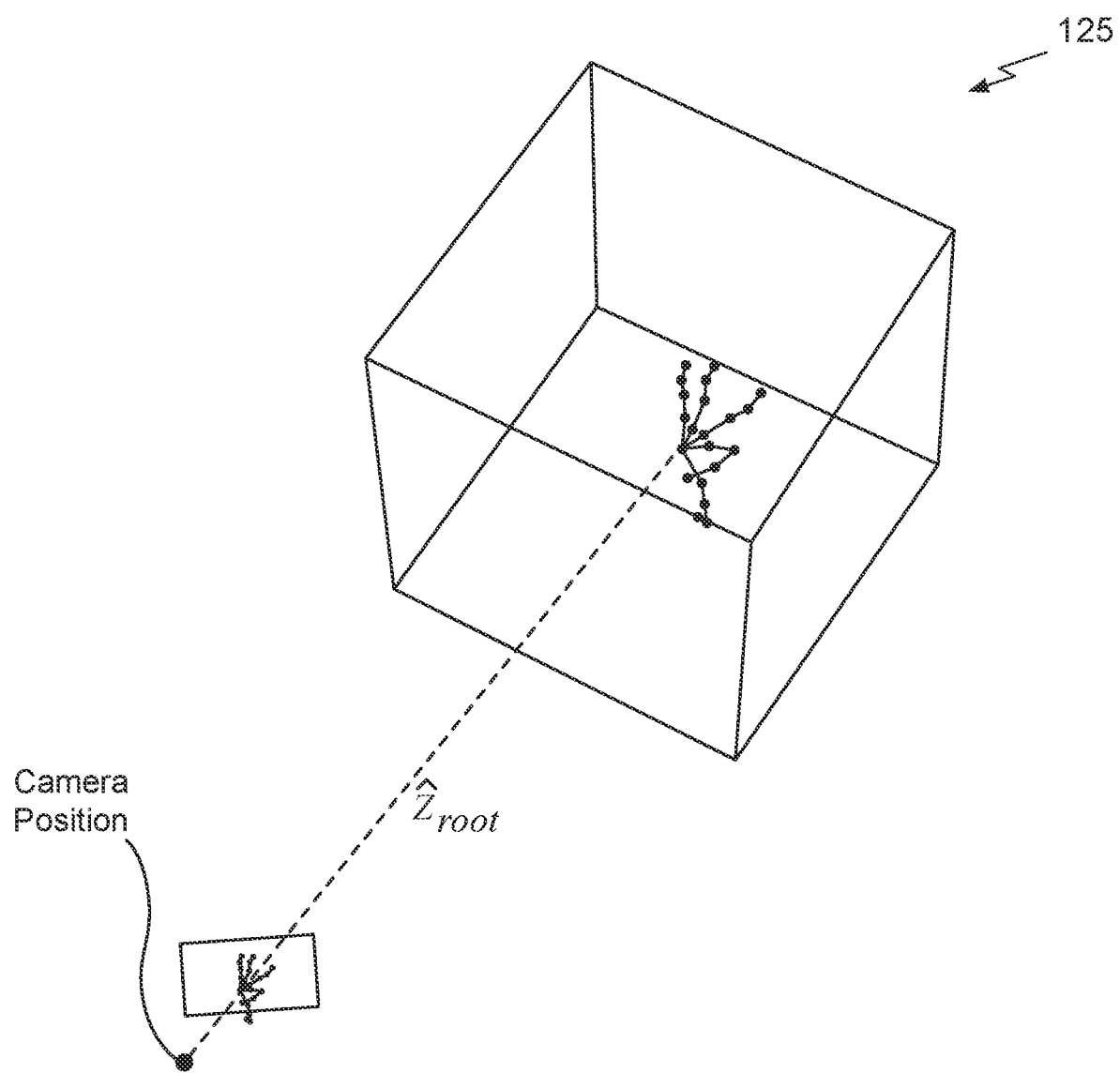
FIG. 1C illustrates a conceptual diagram of depth for a scale and translation invariant 2.5D representation, in accordance with an embodiment.

FIG. 1C illustrates a conceptual diagram 125 of depth for the 2.5D representation, in accordance with an embodiment. Given a 2.5D pose $\hat{P}^{2.5D} = \mathcal{F}(I)$, the depth $\hat{Z}_{root}$ of the root keypoint relative to the camera position is needed to reconstruct the scale normalized 3D pose $\hat{P}$ using Equation (1). While there are many possible 3D poses that can have the same 2D projection 126, given the 2.5D pose and intrinsic camera parameters for a monocular camera 127, there exists a unique 3D pose 128 that satisfies $$(\hat{X}_n - \hat{X}_m)^2 + (\hat{Y}_n - \hat{Y}_m)^2 + (\hat{Z}_n - \hat{Z}_m)^2 = C^2, \quad (3)$$

where (n, m=parent(n)) is the pair of keypoints used for normalization in Equation (2). Equation (3) can be rewritten in terms of the 2D projections $(x_n, y_n)$ and $(x_m, y_m)$ as follows:

$$(x_n \hat{Z}_n - x_m \hat{Z}_m)^2 + (y_n \hat{Z}_n - y_m \hat{Z}_m)^2 + (\hat{Z}_n - \hat{Z}_m)^2 = C^2. \quad (4)$$

Subsequently, replacing $\hat{Z}_n$ and $\hat{Z}_m$ with $(\hat{Z}_{root} + \hat{Z}_n^r)$ and $(\hat{Z}_{root} + \hat{Z}_m^r)$, respectively, yields:

$$(x_n(\hat{Z}_{root} + \hat{Z}_n^r) - x_m(\hat{Z}_{root} + \hat{Z}_m^r))^2 + (y_n(\hat{Z}_{root} + \hat{Z}_n^r) - y_m(\hat{Z}_{root} + \hat{Z}_m^r))^2 + ((\hat{Z}_{root} + \hat{Z}_n^r) - (\hat{Z}_{root} + \hat{Z}_m^r))^2 = C^2. \quad (5)$$

Given the 2.5D coordinates of both keypoints n and m, $\hat{Z}_{root}$ is the only unknown in Equation (5). Simplifying Equation (5) further leads to a quadratic equation with the following coefficients $$a = (x_n - x_m)^2 + (y_n - y_m)^2$$

$$b = \hat{Z}_n^r(x_n^2 + y_n^2 - x_n x_m - y_n y_m) + \hat{Z}_m^r(x_m^2 + y_m^2 - x_n x_m - y_n y_m)$$

$$c = (x_n \hat{Z}_n^r - x_m \hat{Z}_m^r)^2 + (y_n \hat{Z}_n^r - y_m \hat{Z}_m^r)^2 + (\hat{Z}_n^r - \hat{Z}_m^r)^2 - C^2. \quad (6)$$

The result is two values for the unknown variable $\hat{Z}_{root}$, one in front of the camera and one behind the camera. The solution in front of the camera is chosen, $$\hat{Z}_{root} = \frac{0.5\left(-b + \sqrt{b^2 - 4ac}\right)}{a}. \quad (7)$$

Given the value of $\hat{Z}_{root}$, $\hat{P}^{2.5D}$, and the intrinsic camera parameters $\mathcal{K}$, the scale normalized 3D pose can be reconstructed by back-projecting the 2D pose p using Equation (1). In an embodiment, C=1, and the distance between the first joint (metacarpophalangeal—MCP) of the index finger and palm (root) is used to calculate the scale factors. In an embodiment, first joint of the index finger and the root are defined as the keypoints n and m because those keypoints are the most stable in terms of 2D pose estimation.

The scale normalized 3D pose $\hat{P}$ of the hand is recovered by the 3D pose reconstruction unit 110 and, in order to recover the absolute 3D pose P, the global scale of the hand needs to be known. In many scenarios the global scale of the hand can be known a priori, however, in case it is not available, the scale s may be estimated by $$\hat{s} = \underset{s}{\arg\min} \sum_{k,l \in \mathcal{E}} \left(s \cdot \|\hat{P}_k - \hat{P}_l\| - \mu_{kl}\right)^2, \quad (8)$$

where $\mu_{kl}$ is the mean length of the bone between keypoints k and l in the training data, and $\varepsilon$ defines the kinematic structure of the hand.

Figure 1D:
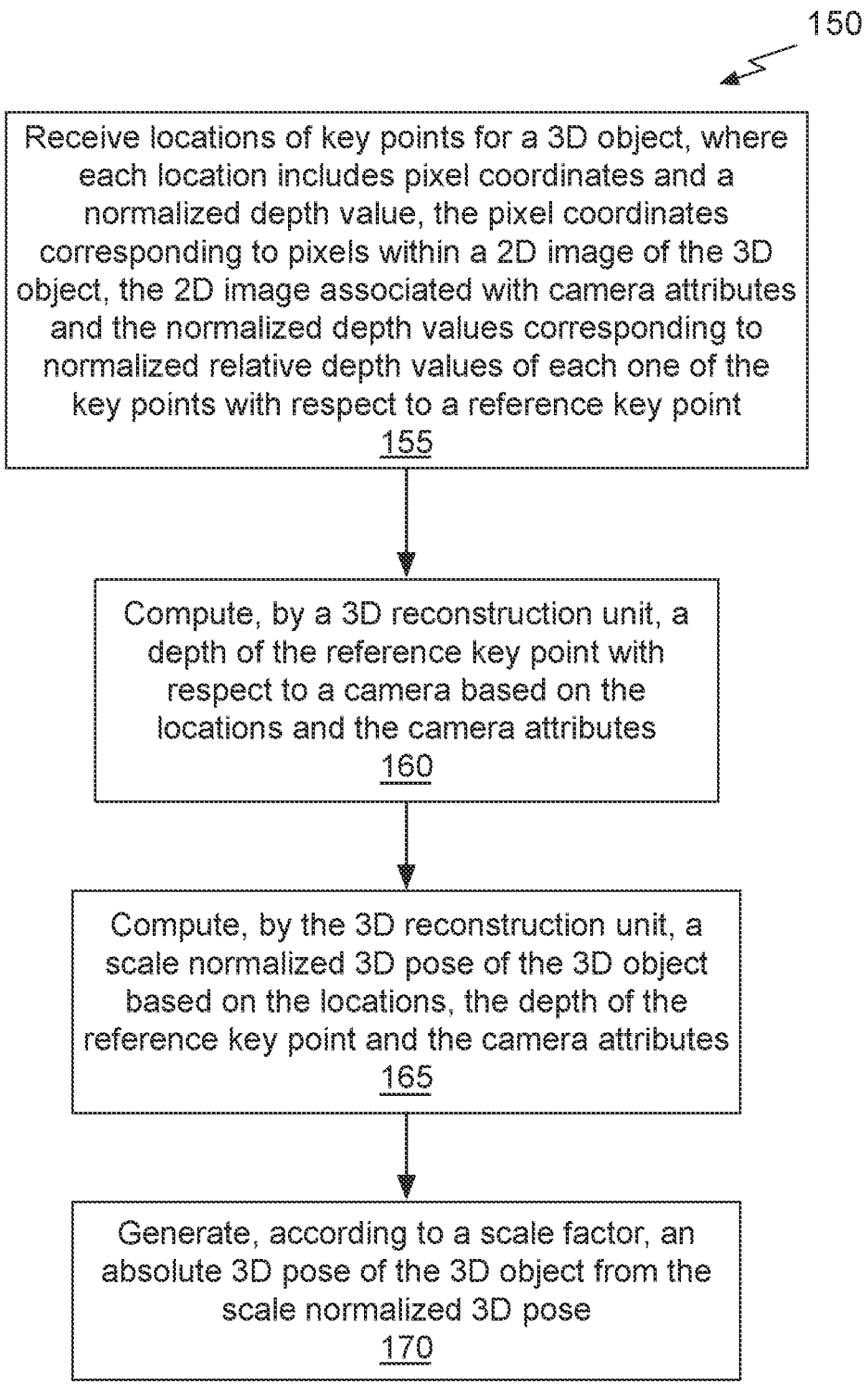
FIG. 1D illustrates a flowchart of a method for reconstructing a 3D pose from 2.5D keypoint locations, in accordance with an embodiment.

FIG. 1D illustrates a flowchart of a method 150 for reconstructing a 3D pose from 2.5D keypoint locations, in accordance with an embodiment. Although method 150 is described in the context of a processing unit, the method 150 may also be performed by a program, custom circuitry, or by a combination of custom circuitry and a program. For example, the method 150 may be executed by a GPU (graphics processing unit), CPU (central processing unit), or any processor capable of performing the operations of the 3D pose reconstruction unit 110 and/or the scale unit 120.

Furthermore, persons of ordinary skill in the art will understand that any system that performs method 150 is within the scope and spirit of embodiments of the present disclosure.

At step 155, locations of keypoints for a 3D object are received. In an embodiment, the locations are provided in a normalized 2.5D representation. Each location includes pixel coordinates and a normalized depth value $(x_k, y_k, \hat{Z}_k^r)$, where the pixel coordinates correspond to pixels within a 2D image of the 3D object associated with camera parameters (attributes) and the normalized depth values correspond to normalized relative depth values of each one of the keypoints with respect to a reference keypoint. In an embodiment, the reference keypoint is the root and the normalized relative depth values for each keypoint k are computed as $Z_k^r = Z_k - Z_{root}$.

At step 160, the 3D pose reconstruction unit 110 computes a depth of the reference keypoint with respect to a camera, $\hat{Z}_{root}$, based on the locations and the camera parameters. At step 165, the 3D pose reconstruction unit 110 computes a scale normalized 3D pose of the 3D object based on the locations, the depth of the reference keypoint, and the camera parameters. In an embodiment, the normalized depth values are computed relative to the reference keypoint. In an embodiment, the scale normalized 3D pose is computed based on the depth of the reference keypoint that is calculated using the locations. In an embodiment, the normalized depth values are invariant for changes in a scale and/or translation of the 3D object.

At step 170, an absolute 3D pose P of the 3D object is generated from the scale normalized 3D pose, according to a scale factors. In an embodiment, the scale factor is estimated and corresponds to a component of the 3D object. In an embodiment, the scale factor is measured and corresponds to a component of the 3D object. In an embodiment, the component is a length between two vertices or keypoints in the 3D object. In an embodiment, the component is a length associated with an element (e.g., line, curve, etc.) of the 3D object. In sum, the 2.5D keypoint locations are processed to reconstruct a scale normalized 3D pose of the object. In an embodiment, the scale normalized 3D pose is computed by back-projecting the 2D pose using the camera parameters and a computed depth of the reference keypoint. The scale normalized 3D pose is then converted to an absolute 3D pose using the measured or estimated scale factor.

A neural network architecture may be used to estimate the 2.5D pose of an object from an image of the object. In an embodiment, the 2.5D location for each keypoint are generated via latent pixel coordinate data and latent depth data produced by a neural network model. A training dataset for the neural network model includes ground-truth (x,y) pixel coordinate data annotating (x,y) locations and may also include ground-truth depth data annotating depth values for each keypoint of an input image. In an embodiment, computed errors between the ground truth data and the 2.5D keypoint data generated by the system are backpropagated through the layers of the neural network model to update parameters used for generating the latent pixel coordinate data and/or the latent depth data.

Conventionally, two main learning paradigms are used to train neural networks for pose estimation, namely heat map regression and holistic pose regression. Heatmap regression is a standard approach for 2D pose estimation since the keypoints can be accurately localized in the image via per-pixel predictions. Creating volumetric heatmaps for 3D pose estimation, however, results in very high computational overhead. Therefore, holistic regression is a standard approach for 3D pose estimation, but holistic regression suffers from accurate 2D keypoint localization. Because prediction of both the 2D pose (x,y) and depth values is needed for the 2.5D pose representation, a new heatmap representation referred to as 2.5D heatmaps is developed. For the 2.5D heatmaps, 2D heatmaps for 2D keypoint localization and a depth map for depth prediction are produced for each keypoint. Importantly, the 2.5D heatmaps do not have to be designed manually, but may instead be learned in a latent manner. To ensure that the 2.5D heatmaps may be learned by the neural network model, the 2.5D heatmaps are converted to 2.5D coordinates in a differentiable manner. In an embodiment, a softargmar operation converts the 2.5D heatmaps to 2.5D coordinates. The resulting 2.5D heatmaps are compact, invariant to scale and translation, and have the potential to localize keypoints with sub-pixel accuracy.

FIG. 2A illustrates a block diagram of a 2.5D keypoint estimation system 200, in accordance with an embodiment. The 2.5D keypoint estimation system 200 includes a neural network model 210, a per-keypoint depth computation unit 220, and a soft-argmax 215. The neural network model 210 receives an input image of a 3D object and generates latent depth data for each associated keypoint of the 3D object in the input image. In an embodiment, the latent depth data are depth maps, and a depth map is generated for each keypoint. Latent pixel coordinate data for each keypoint are also received by the 2.5D keypoint estimation system 200. In an embodiment, the latent pixel coordinate data for a particular keypoint is a likelihood of the keypoint at each image location (pixel). In an embodiment, the latent pixel coordinate data for a particular keypoint is a 2D probability density function in pixel space.

The soft-argmax 215 converts the latent pixel coordinate data to the 2.5D keypoint (x,y) coordinate data p. In an embodiment, the neural network model 210 generates latent 2D heatmaps (not shown in FIG. 2A) that are converted to likelihood estimates (e.g., probability maps) for the keypoints to produce the latent pixel coordinate data $H^{2D}$. In an embodiment, the neural network model 210 is a convolutional neural network (CNN). In an embodiment, the neural network model 210 is an encoder-decoder neural network including skip connections.

The latent pixel coordinate data $H^{2D}$ for keypoint localization and depth maps $H^{\hat{Z}}$ for depth predictions provide a compact heatmap representation, referred to as 2.5D heatmaps. While the 2D heatmap $H_k^{2D}$ represents the likelihood of the $k^{th}$ keypoint at each pixel location, the depth map $H_k^{\hat{Z}}$ provides the scale normalized and root-relative depth prediction for the corresponding pixels. The representation of depth maps is scale and translation invariant and remains consistent across similar poses, therefore, it is significantly easier for the neural network model 210 to learn to generate the latent depth data. The neural network model 210 provides a K channel output for depth maps $H^{\hat{Z}}$, where K is the number of keypoints.

The latent depth data and latent pixel coordinate data for keypoints in the input image are processed by a per-keypoint depth computation unit 220 to generate depth data $\hat{Z}$ as a portion of the scale normalized 2.5D representation $P_k^{2.5D}$ defining the 2.5D keypoint locations. In an embodiment, the per-keypoint depth computation unit 220 multiplies the latent depth data with the latent pixel coordinate data to produce the depth data for each keypoint. In an embodiment, the per-keypoint depth computation unit 220 performs element-wise multiplication to produce the depth data for each keypoint. In an embodiment, the depth data for each keypoint is represented as a depth map. In an embodiment, the per-keypoint depth computation unit 220 sums the depth data for each keypoint to compute the normalized depth values $\hat{Z}^r$. In an embodiment, the per-keypoint depth computation unit 220 performs operations that are fully differentiable. The final 3D pose may then be estimated by the 3D pose reconstruction system 100 using the scale normalized 2.5D representation of the keypoints output by the 2.5D keypoint estimation system 200.

Importantly, p and/or $\hat{Z}$ may be normalized according to a scale of the object for training the neural network model 210. In an embodiment, when the object is a hand, the depth data is normalized based on a scale factor equal to a distance between the first joint of the index finger and palm of the hand. Similarly, in an embodiment, the keypoint (x,y) coordinate data is normalized based on the scale factor. The scale factor can be any distance function of object's skeleton model that remains constant or nearly constant during articulations. In an embodiment, the depth data is determined relative to a reference keypoint. In an embodiment, the reference keypoint is located on the palm of the hand. The reference keypoint can be chosen to be any keypoint as a function of object's skeleton model.

Although the 2.5D keypoint estimation system 200 is described in the context of processing units, one or more of the units, the neural network model 210, the per-keypoint depth computation unit 220, and the soft-argmax 215, may be implemented as a program, custom circuitry, or by a combination of custom circuitry and a program. For example, the neural network model 210 may be implemented by a GPU (graphics processing unit), CPU (central processing unit), or any processor capable of performing the operations of the neural network model 210. Furthermore, persons of ordinary skill in the art will understand that any system that performs the operations of the 2.5D keypoint estimation system 200 is within the scope and spirit of embodiments of the present disclosure.

Figure 2B:
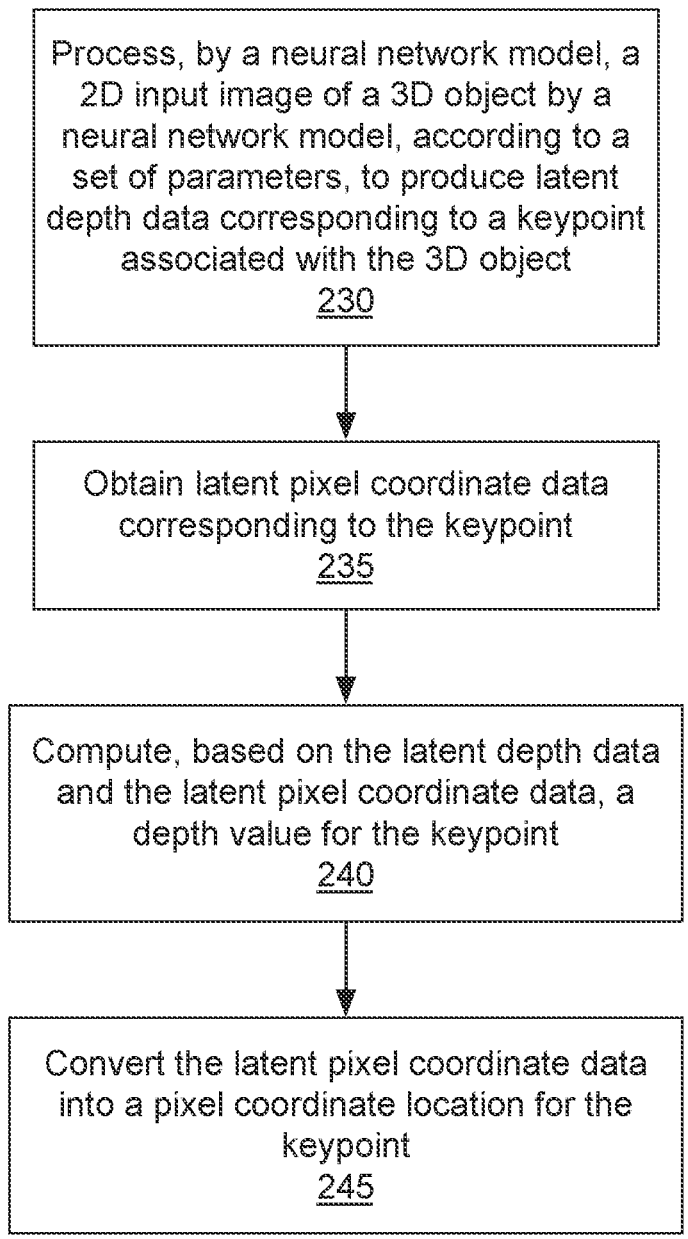
FIG. 2B illustrates a flowchart of a method for estimating 2.5D keypoints from an image, in accordance with an embodiment.

FIG. 2B illustrates a flowchart of a method 225 for estimating 2.5D keypoints from an image, in accordance with an embodiment. Although method 225 is described in the context of a processing unit, the method 150 may also be performed by a program, custom circuitry, or by a combination of custom circuitry and a program. For example, the method 225 may be executed by a GPU (graphics processing unit), CPU (central processing unit), or any processor capable of performing the operations of the 2.5D keypoint estimation system 200. Furthermore, persons of ordinary skill in the art will understand that any system that performs method 225 is within the scope and spirit of embodiments of the present disclosure.

At step 230, the neural network model 210 processes a 2D input image of a 3D object by the neural network model 210, according to a set of parameters, to produce latent depth data corresponding to keypoints associated with the 3D object. The parameters are learned during training of the neural network model 210. In an embodiment, the input image has dimensions h×w×3, where 3 is the number of color channels (e.g., red, green, blue) used to represent the input image. In an embodiment, the latent depth data are latent depth maps of dimensions h×w×K. In other words, each keypoint has a corresponding latent depth map.

At step 235, the latent pixel coordinate data corresponding to the keypoints are obtained by the 2.5D keypoint estimation system 200. In an embodiment, the latent pixel coordinate data is generated by the neural network model 210. In an embodiment, the latent pixel coordinate data are probability maps computed based on latent 2D heatmaps of dimensions h×w×K.

At step 240, the per-keypoint depth computation unit 220 computes a depth value, based on the latent depth data and the latent pixel coordinate data, for each one of the keypoints. In an embodiment, the depth values are normalized depth values computed relative to a reference keypoint. In an embodiment, the depth values are invariant for changes in a scale and/or translation of the 3D object. At step 245, the soft-argmax 215 converts the latent pixel coordinate data into pixel coordinate locations for each one of the keypoints.

Figure 2C:
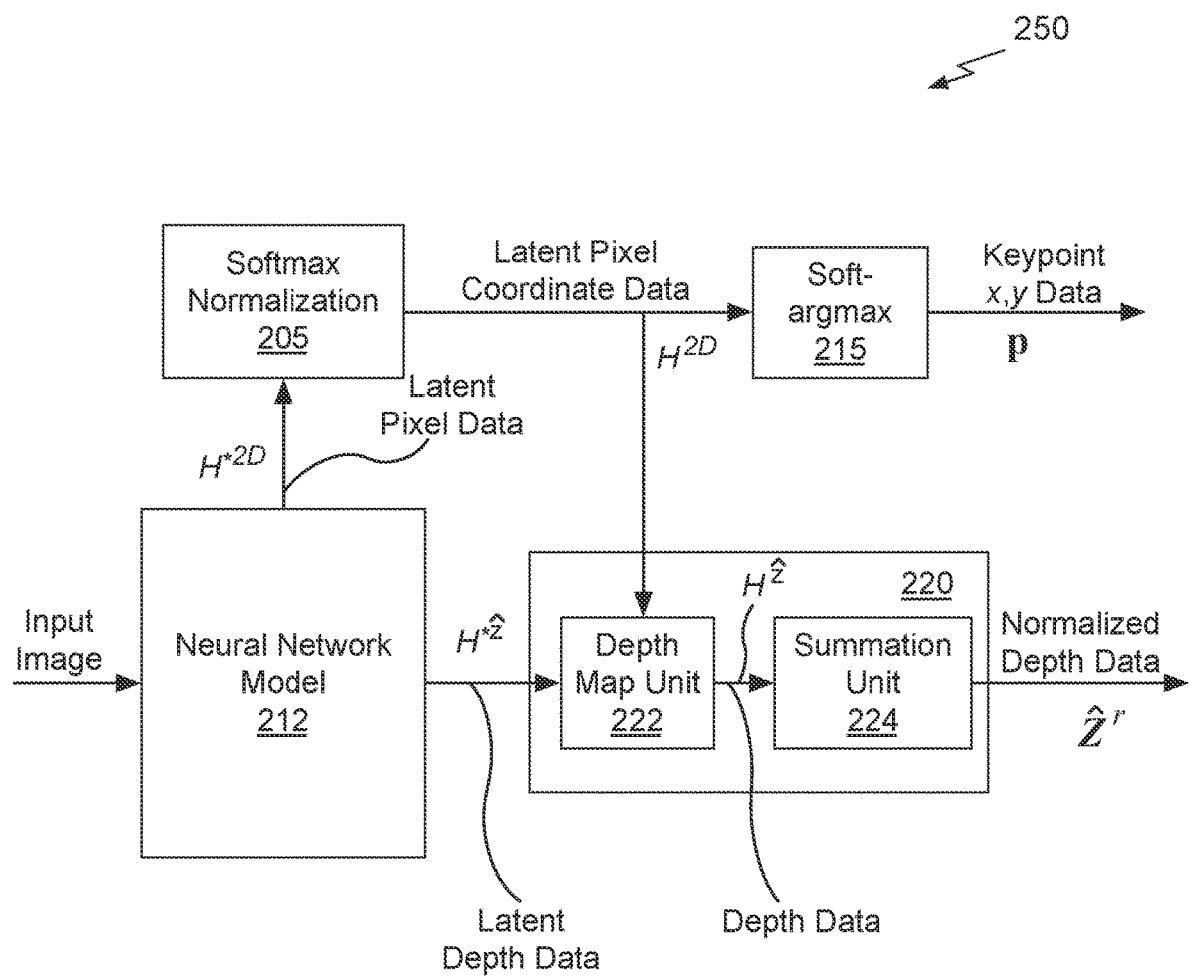
FIG. 2C illustrates a block diagram of another 2.5D keypoint estimation system, in accordance with an embodiment.

FIG. 2C illustrates a block diagram of another 2.5D keypoint estimation system 250, in accordance with an embodiment. The 2.5D keypoint estimation system 250 includes a neural network model 212, a softmax normalization 205, the per-keypoint depth computation unit 220, and the soft-argmax 215. Given an input image of a 3D object, the neural network model 212 produces latent depth data and latent pixel data for each one of the keypoints. In an embodiment, the latent depth data and latent pixel data comprise latent 2.5D heatmaps containing the latent 2D heatmaps $H^{*2D}$ and latent depth maps $H^{*Z}$. In an embodiment, the neural network model 212 provides a 2K channel output with K channels for each 2D localization heatmap $H^{2D}$ and K channels for each depth map $H^Z$.

The softmax normalization 205 converts the latent pixel data into the latent pixel coordinate data. In an embodiment, latent 2D heatmaps are converted to latent pixel coordinate data, namely, probability maps $H^{2D}$ using softmax normalization. The soft-argmax 215 converts the latent pixel coordinate data to the pixel coordinate locations, namely, the 2.5D keypoint (x,y) coordinate data p (2D pose).

The latent depth data $H^{*Z}$ and latent pixel coordinate data $H^{2D}$ for the input image are processed by the per-keypoint depth computation unit 220 to generate depth data $\hat{Z}$. A depth map unit 222 performs element-wise multiplication between the latent depth data (latent depth maps $H^{*Z}$) and the latent pixel coordinate data $H^{2D}$ to produce the depth data $H^Z$ for each keypoint. In an embodiment, the summation unit 224 is configured to, for each keypoint, sum a Hadamard product of the latent depth data and the latent pixel coordinate data to compute the normalized depth values $\hat{Z}^r$. In an embodiment, the per-keypoint depth computation unit 220 performs operations that are fully differentiable. Note that the computation of both the keypoint (x,y) data (e.g., 2D pose) and the corresponding depth value is fully differentiable. Hence, each of the neural network models 210 and 212 can be trained end-to-end, for generating the latent 2.5D heatmap representation.

The neural network models 210 and 212 may be jointly trained with 2D and/or 3D keypoints labeled on a single image (or different images) using the scale normalized 2.5D representation. For training, the scale normalized 2.5D representation can be estimated from image crop (region of the image within a defined crop bounding box). Using the softargmax 215 for 2D coordinate regression enables the neural network model 210 and/or 212 to implicitly learn prediction of 2D heatmaps without putting constraints on the 2D heatmaps and allows sub-pixel accuracy.

In contrast to existing techniques, training the neural network models 210 and 212 does not require hand-designed target heatmaps for 2D coordinate regression, instead implicitly learned latent 2.5 heatmaps output by the neural network model 212 are converted to the scale normalized 2.5D coordinates in a differentiable manner within the 2.5D keypoint estimation system 250. In contrast with neural network models that can be trained only given input image and 2D coordinates or 3D coordinates, but not if both data sources are mixed, the neural network models 210 and 212 may be trained using 2D coordinates and 3D coordinates simultaneously, without any constraints.

The 3D pose reconstruction system 100 calculates the 3D pose given camera intrinsic parameters (e.g., camera attributes) and the scale factor. The 2.5D keypoint estimation systems 200 and 250 learn to estimate the scale normalized 2.5D pose independent of the scale of the object and/or viewpoint. Conventional techniques for estimating 3D poses rely on data driven approaches that learn the scale of the particular 3D object for all particular viewpoints and suffer from generalization to unseen subjects.

Figure 2D:
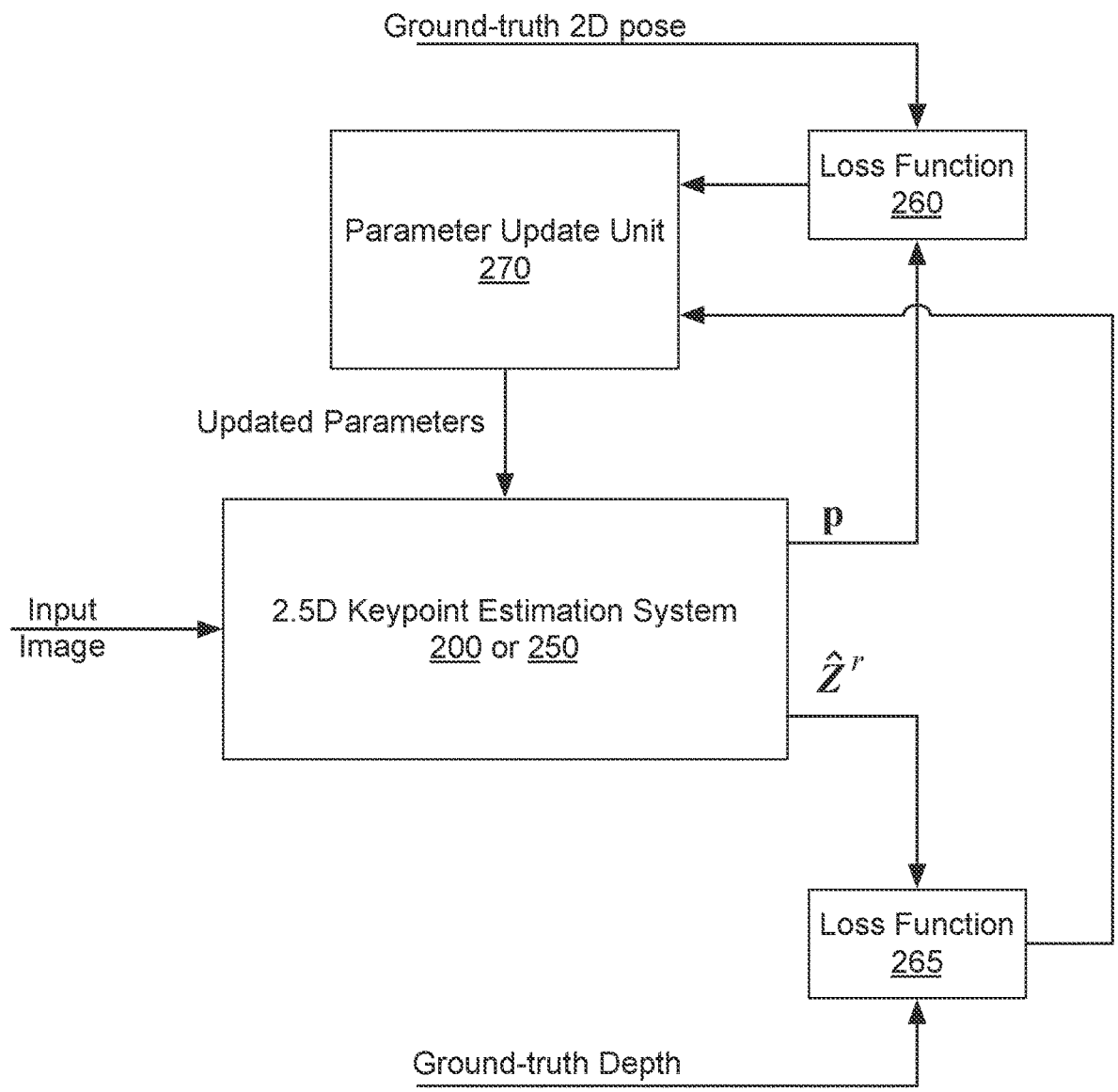
FIG. 2D illustrates a block diagram of a training configuration for the 2.5D keypoint estimation system, in accordance with an embodiment.

FIG. 2D illustrates a block diagram of a training configuration for the 2.5D keypoint estimation system 200 or 250, in accordance with an embodiment. The training configuration includes the 2.5D keypoint estimation system 200 or 250, parameter update unit 270, and loss functions 260 and 265. A training dataset includes input images paired with either ground-truth 2D pose annotations (x,y) or ground-truth 3D pose annotations (x, y, depth). During training, each input image is processed by the 2.5D keypoint estimation system 200 or 250 to produce the 2.5D pose represented by the 2D pose p and the root-relative depth $\hat{Z}^r$. The loss function 260 evaluates a function to compare the estimated 2D pose (the pixel coordinate location) and a ground-truth 2D pose for each keypoint in the input image and outputs loss data to the parameter update unit 270. The loss function 265 evaluates a function to compare the estimated depth and a ground-truth depth for each keypoint in the input image and outputs loss data to the parameter update unit 270. The parameter update unit 270, based on the loss data, updates the parameters used by the 2.5D keypoint estimation system 200 or 250 to process the input image to reduce differences between the estimated 2D pose and the estimated depth value for each keypoint and the ground-truth 2D pose and the ground-truth depth, respectively. In an embodiment, the parameter update unit 270 backpropagates the loss data through one or more layers of the neural network 210 or 212 to compute updated parameters for each layer.

In order to regress the 2.5D pose $\hat{P}^{2.5D}$ from an RGB image of a 3D object, the function $\mathcal{F}$ is learned by the neural network model 210 or 212. The neural network model 210 or 212 is trained using a loss function $\mathcal{L}$ which consists of two parts $\mathcal{L}_{xy}$ and $\mathcal{L}_{\hat{Z}}$, each responsible for the regression of 2D pose and root-relative depths for the 3D object keypoints, respectively. The loss function 260 may compute the loss function $\mathcal{L}_{xy}$ and the loss function 265 may compute the loss function $\mathcal{L}_{\hat{Z}}$. Formally, the loss can be written as follows:

$$\mathcal{L}(\hat{P}^{2.5D}) = \mathcal{L}_{xy}(p, p_{gt}) + \alpha \mathcal{L}_{\hat{Z}}(\hat{Z}^r, \hat{Z}^{r,gt}), \quad (9)$$

where $\hat{Z}^r = \{\hat{Z}_k^r\}_{r \in K}$ and $\hat{Z}^{r,gt} = \{\hat{Z}_k^{r,gt}\}_{r \in K}$ and gt refers to ground-truth annotations. The loss function has the advantage that multiple sources of training may be utilized, i.e., in-the-wild images with only 2D pose annotations and constrained or synthetic images with accurate 3D pose annotations. While $\mathcal{L}_{xy}$ is valid for all training samples, $\mathcal{L}_{\hat{Z}}$ is enforced only when the 3D pose annotations are available, otherwise $\mathcal{L}_{\hat{Z}}$ is not considered.

In contrast with holistic regression techniques, heatmaps have the advantage of providing higher output resolution, which helps in accurately localizing the keypoints. However, heatmaps are scarcely used for 3D pose estimation because a 3D volumetric heatmap representation results in a high computational and storage cost. Therefore, the compact 2.5D heatmap representation is used by the 2.5D keypoint estimation systems 200 and 250 and the 3D pose reconstruction system 100. Consequently, the neural network models 210 and 212 may be trained using direct 2.5D heatmap regression.

As previously explained, the compact 2.5D heatmap representation consists of 2D heatmaps $H^{2D}$ for keypoint localization and depth maps $H^{\hat{Z}}$ for depth predictions. While the 2D heatmap $H_k^{2D}$ represents the likelihood of the $k^{th}$ keypoint at each pixel location, the depth map $H_k^{\hat{Z}}$ provides the scale normalized and root-relative depth prediction for the corresponding pixels. The neural network model 210 provides a 2K channel output with K channels for 2D localization heatmaps $H^{2D}$ and K channels for depth maps $H^{\hat{Z}}$. The target heatmap $H_k^{2D,gt}$ for the $k^{th}$ keypoint is defined as $$H_k^{2D,gt}(p) = \exp\left(-\frac{\|p - p_k^{gt}\|}{\sigma^2}\right), p \in \Omega \quad (10)$$

where $p_k^{gt}$ is the ground-truth location of the $k^{th}$ keypoint, $\sigma$ controls the standard deviation of the heatmaps and $\Omega$ is the set of all pixel locations in input image I. Since the ground-truth depth maps are not available, the ground-truth depth maps are defined by $$H_k^{\hat{Z}} = \hat{Z}_k^{r,gt} \cdot H_k^{2D,gt} \quad (11)$$

where $\hat{Z}_k^{r,gt}$ is the ground-truth normalized root-relative depth value of the $k^{th}$ and the corresponding depth value is obtained as the pixel with the maximum likelihood $$p_k = \underset{p}{\mathrm{argmax}} H_k^{2D}(p), \quad (12)$$

and the corresponding depth value is obtained as, $$\hat{Z}_k^r = H_k^{\hat{Z}}(p_k). \quad (13)$$

The 2.5D heatmap representation as described in the previous section is, arguably, not the most optimal representation. First, the ground-truth heatmaps are hand designed and are not ideal, i.e., $\sigma$ remains fixed for all keypoints and cannot be learned due to indifferentiability of Equation (12). Ideally, the 2.5D heatmaps should be adapted for each keypoint of a 3D object, such as a hand, e.g., heatmaps should be very peaky for finger-tips while relatively wide for the palm. Secondly, the Gaussian distribution is a natural choice for 2D keypoint localization, but is not very intuitive for depth prediction, i.e., the depth stays roughly the same throughout the palm of a hand but is modeled as Gaussians. These problems may be alleviated by using a latent representation of 2.5D heatmaps, i.e., the neural network models 210 and 212 learn the optimal representation by minimizing a loss function in a differentiable way.

To this end, the 2K channel output of the neural network models 210 and 212 is considered as latent variables $H^*{}_k^{2D}$ and $H^*{}_k^{\hat{Z}}$ for 2D heatmaps and depth maps, respectively. Then, in an embodiment, spatial softmax normalization is applied by the softmax normalization 205 to 2D heatmap $H^*{}_k^{2D}$ of each keypoint k to convert each of the 2D heatmaps to a probability map $$H_k^{2D}(p) = \frac{\exp(\beta_k H_k^{*2D}(p))}{\Sigma_{p' \in \Omega} \exp(\beta_k H_k^{*2D}(p'))}, \quad (14)$$

where $\Omega$ is the set of all pixel locations in the input 2D heatmap $H^*_k{}^{2D}$, and $\beta_k$ is the learnable parameter that controls the spread of the output heatmaps $H^{2D}$. Finally, in an embodiment, the 2D keypoint position of the $k^{th}$ keypoint is computed by the soft-argmax 215 as the weighted average of the 2D pixel coordinates, $$p_k = \Sigma_{p \in \Omega} H_k^{2D}(p) \cdot p, \quad (15)$$

while, in an embodiment, the corresponding depth value is obtained by the per-keypoint depth computation unit 220 as the summation of the Hadamard product of $H_k^{2D}(p)$ and $H^*_k{}^{\hat{Z}}(p)$ as follows $$\hat{Z}_k^r = \Sigma_{p \in \Omega} H_k^{2D}(p) \circ H^*_k{}^{\hat{Z}}(p). \quad (16)$$

In contrast to the heatmaps with fixed standard deviation, the spread of the latent heatmaps can be adapted for each keypoint by learning the parameter $\beta_k$, while the depth maps are also learned implicitly without any ad-hoc design choices. In an embodiment, the parameter update unit 270 is configured to adjust the set of parameters to control a spread of the latent pixel coordinate data.

The 2.5D keypoint estimation systems 200 and 250 allow for the input spatial resolution to be retained and keypoints of the 3D object can be localized with sub-pixel accuracy. The 2.5D keypoint estimation systems 200 and 250 are fully differentiable and the 2.5D pose representation is compact. Furthermore, the 2.5D pose representation is translation and scale invariant, while also providing high spatial output resolution. Moreover, in contrast to conventional techniques, the 2.5D keypoint estimation systems 200 and 250 do not require hand-designed target heatmaps, which can arguably be sub-optimal for a particular problem. Instead, the 2.5D keypoint estimation systems 200 and 250 implicitly learn a latent 2.5D heatmap representation and convert the 2.5 heatmap representation to 2.5D coordinates in a differentiable way.

Finally, note that given the 2.5D coordinates, the 3D pose may be recovered by the 3D pose reconstruction system 100. Conventional techniques for estimating a 3D pose either make very strong assumptions such as the ground-truth location of the root and the global scale of the hand in 3D is known, or resort to an approximate solution. Conventional techniques try to directly regress the absolute depth from the cropped and scaled image regions which is a very ambiguous task. In contrast, no assumptions are made by the 3D pose reconstruction system 100, nor does the 3D pose reconstruction system 100 try to solve any ambiguous task. Instead, the scale and translation invariant 2.5D pose representation can be easily obtained using the neural network models 210 and/or 212, and then the 3D pose reconstruction system 100 provides an exact solution to obtain the absolute 3D pose up to a scale factor while approximating only the global scale of the object.

Parallel Processing Architecture

Figure 3:
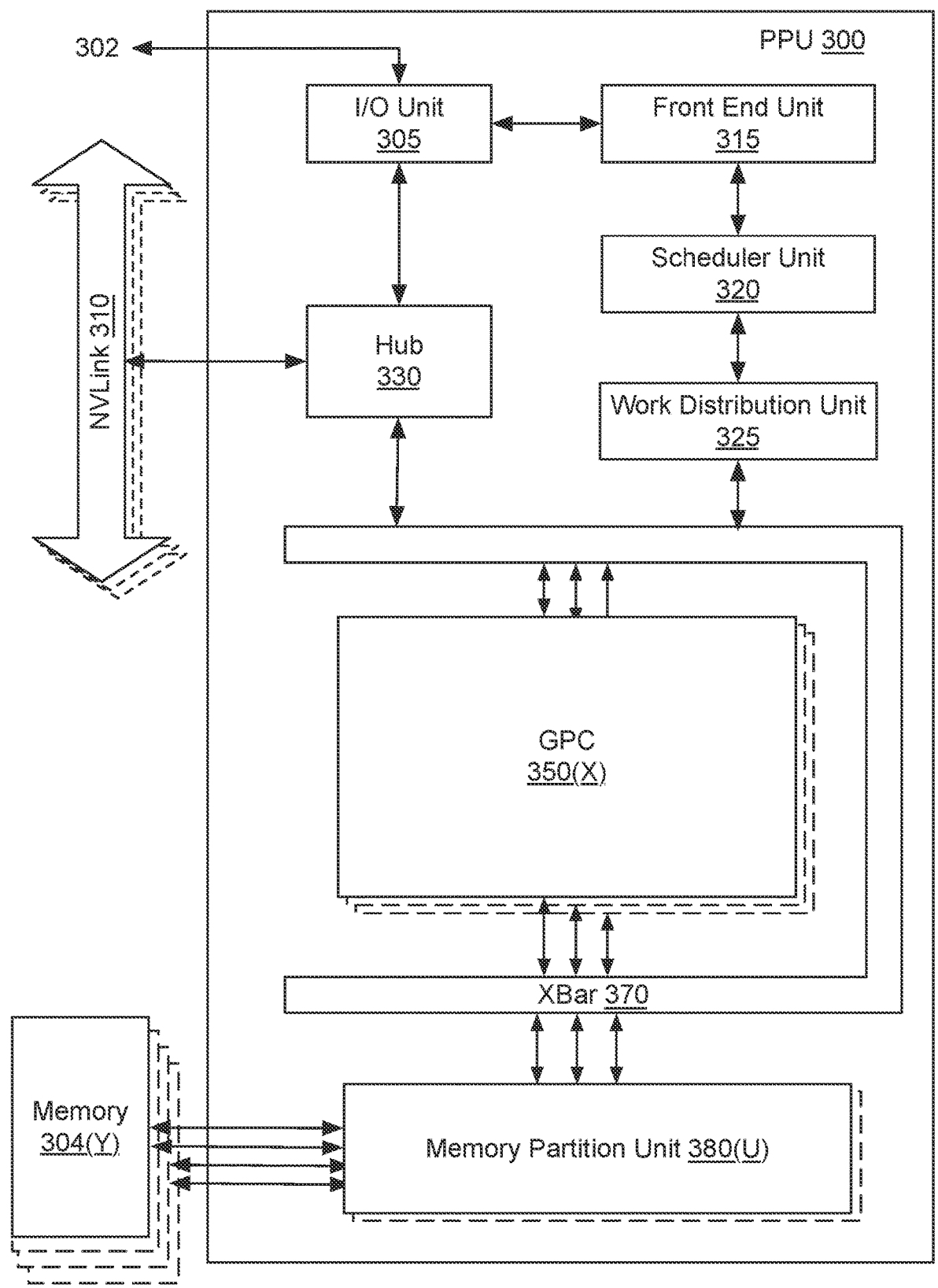
FIG. 3 illustrates a parallel processing unit, in accordance with an embodiment.

FIG. 3 illustrates a parallel processing unit (PPU) 300, in accordance with an embodiment. In an embodiment, the PPU 300 is a multi-threaded processor that is implemented on one or more integrated circuit devices. The PPU 300 is a latency hiding architecture designed to process many threads in parallel. A thread (e.g., a thread of execution) is an instantiation of a set of instructions configured to be executed by the PPU 300. In an embodiment, the PPU 300 is a graphics processing unit (GPU) configured to implement a graphics rendering pipeline for processing three-dimensional (3D) graphics data in order to generate two-dimensional (2D) image data for display on a display device such as a liquid crystal display (LCD) device. In other embodiments, the PPU 300 may be utilized for performing general-purpose computations. While one exemplary parallel processor is provided herein for illustrative purposes, it should be strongly noted that such processor is set forth for illustrative purposes only, and that any processor may be employed to supplement and/or substitute for the same.

One or more PPUs 300 may be configured to accelerate thousands of High Performance Computing (HPC), data center, and machine learning applications. The PPU 300 may be configured to accelerate numerous deep learning systems and applications including autonomous vehicle platforms, deep learning, high-accuracy speech, image, and text recognition systems, intelligent video analytics, molecular simulations, drug discovery, disease diagnosis, weather forecasting, big data analytics, astronomy, molecular dynamics simulation, financial modeling, robotics, factory automation, real-time language translation, online search optimizations, and personalized user recommendations, and the like.

As shown in FIG. 3, the PPU 300 includes an Input/Output (I/O) unit 305, a front end unit 315, a scheduler unit 320, a work distribution unit 325, a hub 330, a crossbar (Xbar) 370, one or more general processing clusters (GPCs) 350, and one or more memory partition units 380. The PPU 300 may be connected to a host processor or other PPUs 300 via one or more high-speed NVLink 310 interconnect. The PPU 300 may be connected to a host processor or other peripheral devices via an interconnect 302. The PPU 300 may also be connected to a local memory comprising a number of memory devices 304. In an embodiment, the local memory may comprise a number of dynamic random access memory (DRAM) devices. The DRAM devices may be configured as a high-bandwidth memory (HBM) subsystem, with multiple DRAM dies stacked within each device.

The NVLink 310 interconnect enables systems to scale and include one or more PPUs 300 combined with one or more CPUs, supports cache coherence between the PPUs 300 and CPUs, and CPU mastering. Data and/or commands may be transmitted by the NVLink 310 through the hub 330 to/from other units of the PPU 300 such as one or more copy engines, a video encoder, a video decoder, a power management unit, etc. (not explicitly shown). The NVLink 310 is described in more detail in conjunction with FIG. 5B.

The I/O unit 305 is configured to transmit and receive communications (e.g., commands, data, etc.) from a host processor (not shown) over the interconnect 302. The I/O unit 305 may communicate with the host processor directly via the interconnect 302 or through one or more intermediate devices such as a memory bridge. In an embodiment, the I/O unit 305 may communicate with one or more other processors, such as one or more the PPUs 300 via the interconnect 302. In an embodiment, the I/O unit 305 implements a Peripheral Component Interconnect Express (PCIe) interface for communications over a PCIe bus and the interconnect 302 is a PCIe bus. In alternative embodiments, the I/O unit 305 may implement other types of well-known interfaces for communicating with external devices.

The I/O unit 305 decodes packets received via the interconnect 302. In an embodiment, the packets represent commands configured to cause the PPU 300 to perform various operations. The I/O unit 305 transmits the decoded commands to various other units of the PPU 300 as the commands may specify. For example, some commands may be transmitted to the front end unit 315. Other commands may be transmitted to the hub 330 or other units of the PPU 300 such as one or more copy engines, a video encoder, a video decoder, a power management unit, etc. (not explicitly shown). In other words, the I/O unit 305 is configured to route communications between and among the various logical units of the PPU 300.

In an embodiment, a program executed by the host processor encodes a command stream in a buffer that provides workloads to the PPU 300 for processing. A workload may comprise several instructions and data to be processed by those instructions. The buffer is a region in a memory that is accessible (e.g., read/write) by both the host processor and the PPU 300. For example, the I/O unit 305 may be configured to access the buffer in a system memory connected to the interconnect 302 via memory requests transmitted over the interconnect 302. In an embodiment, the host processor writes the command stream to the buffer and then transmits a pointer to the start of the command stream to the PPU 300. The front end unit 315 receives pointers to one or more command streams. The front end unit 315 manages the one or more streams, reading commands from the streams and forwarding commands to the various units of the PPU 300.

The front end unit 315 is coupled to a scheduler unit 320 that configures the various GPCs 350 to process tasks defined by the one or more streams. The scheduler unit 320 is configured to track state information related to the various tasks managed by the scheduler unit 320. The state may indicate which GPC 350 a task is assigned to, whether the task is active or inactive, a priority level associated with the task, and so forth. The scheduler unit 320 manages the execution of a plurality of tasks on the one or more GPCs 350.

The scheduler unit 320 is coupled to a work distribution unit 325 that is configured to dispatch tasks for execution on the GPCs 350. The work distribution unit 325 may track a number of scheduled tasks received from the scheduler unit 320. In an embodiment, the work distribution unit 325 manages a pending task pool and an active task pool for each of the GPCs 350. The pending task pool may comprise a number of slots (e.g., 32 slots) that contain tasks assigned to be processed by a particular GPC 350. The active task pool may comprise a number of slots (e.g., 4 slots) for tasks that are actively being processed by the GPCs 350. As a GPC 350 finishes the execution of a task, that task is evicted from the active task pool for the GPC 350 and one of the other tasks from the pending task pool is selected and scheduled for execution on the GPC 350. If an active task has been idle on the GPC 350, such as while waiting for a data dependency to be resolved, then the active task may be evicted from the GPC 350 and returned to the pending task pool while another task in the pending task pool is selected and scheduled for execution on the GPC 350.

The work distribution unit 325 communicates with the one or more GPCs 350 via XBar 370. The XBar 370 is an interconnect network that couples many of the units of the PPU 300 to other units of the PPU 300. For example, the XBar 370 may be configured to couple the work distribution unit 325 to a particular GPC 350. Although not shown explicitly, one or more other units of the PPU 300 may also be connected to the XBar 370 via the hub 330.

The tasks are managed by the scheduler unit 320 and dispatched to a GPC 350 by the work distribution unit 325. The GPC 350 is configured to process the task and generate results. The results may be consumed by other tasks within the GPC 350, routed to a different GPC 350 via the XBar 370, or stored in the memory 304. The results can be written to the memory 304 via the memory partition units 380, which implement a memory interface for reading and writing data to/from the memory 304. The results can be transmitted to another PPU 304 or CPU via the NVLink 310. In an embodiment, the PPU 300 includes a number U of memory partition units 380 that is equal to the number of separate and distinct memory devices 304 coupled to the PPU 300. A memory partition unit 380 will be described in more detail below in conjunction with FIG. 4B.

In an embodiment, a host processor executes a driver kernel that implements an application programming interface (API) that enables one or more applications executing on the host processor to schedule operations for execution on the PPU 300. In an embodiment, multiple compute applications are simultaneously executed by the PPU 300 and the PPU 300 provides isolation, quality of service (QoS), and independent address spaces for the multiple compute applications. An application may generate instructions (e.g., API calls) that cause the driver kernel to generate one or more tasks for execution by the PPU 300. The driver kernel outputs tasks to one or more streams being processed by the PPU 300. Each task may comprise one or more groups of related threads, referred to herein as a warp. In an embodiment, a warp comprises 32 related threads that may be executed in parallel. Cooperating threads may refer to a plurality of threads including instructions to perform the task and that may exchange data through shared memory. Threads and cooperating threads are described in more detail in conjunction with FIG. 5A.

Figure 4A:
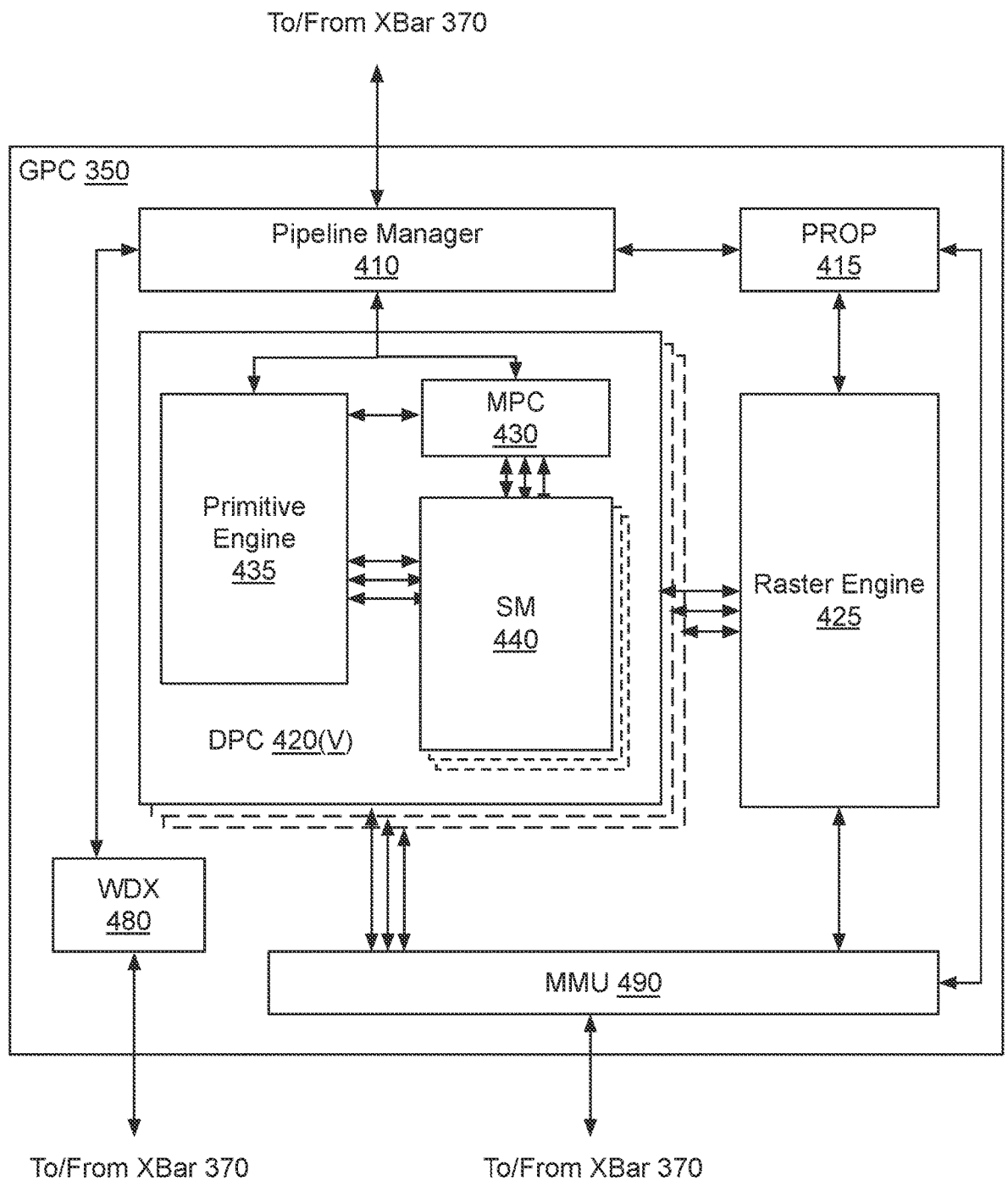
FIG. 4A illustrates a general processing cluster within the parallel processing unit of FIG. 3, in accordance with an embodiment.

FIG. 4A illustrates a GPC 350 of the PPU 300 of FIG. 3, in accordance with an embodiment. As shown in FIG. 4A, each GPC 350 includes a number of hardware units for processing tasks. In an embodiment, each GPC 350 includes a pipeline manager 410, a pre-raster operations unit (PROP) 415, a raster engine 425, a work distribution crossbar (WDX) 480, a memory management unit (MMU) 490, and one or more Data Processing Clusters (DPCs) 420. It will be appreciated that the GPC 350 of FIG. 4A may include other hardware units in lieu of or in addition to the units shown in FIG. 4A.

In an embodiment, the operation of the GPC 350 is controlled by the pipeline manager 410. The pipeline manager 410 manages the configuration of the one or more DPCs 420 for processing tasks allocated to the GPC 350. In an embodiment, the pipeline manager 410 may configure at least one of the one or more DPCs 420 to implement at least a portion of a graphics rendering pipeline. For example, a DPC 420 may be configured to execute a vertex shader program on the programmable streaming multiprocessor (SM) 440. The pipeline manager 410 may also be configured to route packets received from the work distribution unit 325 to the appropriate logical units within the GPC 350. For example, some packets may be routed to fixed function hardware units in the PROP 415 and/or raster engine 425 while other packets may be routed to the DPCs 420 for processing by the primitive engine 435 or the SM 440. In an embodiment, the pipeline manager 410 may configure at least one of the one or more DPCs 420 to implement a neural network model and/or a computing pipeline.

Figure 4B:
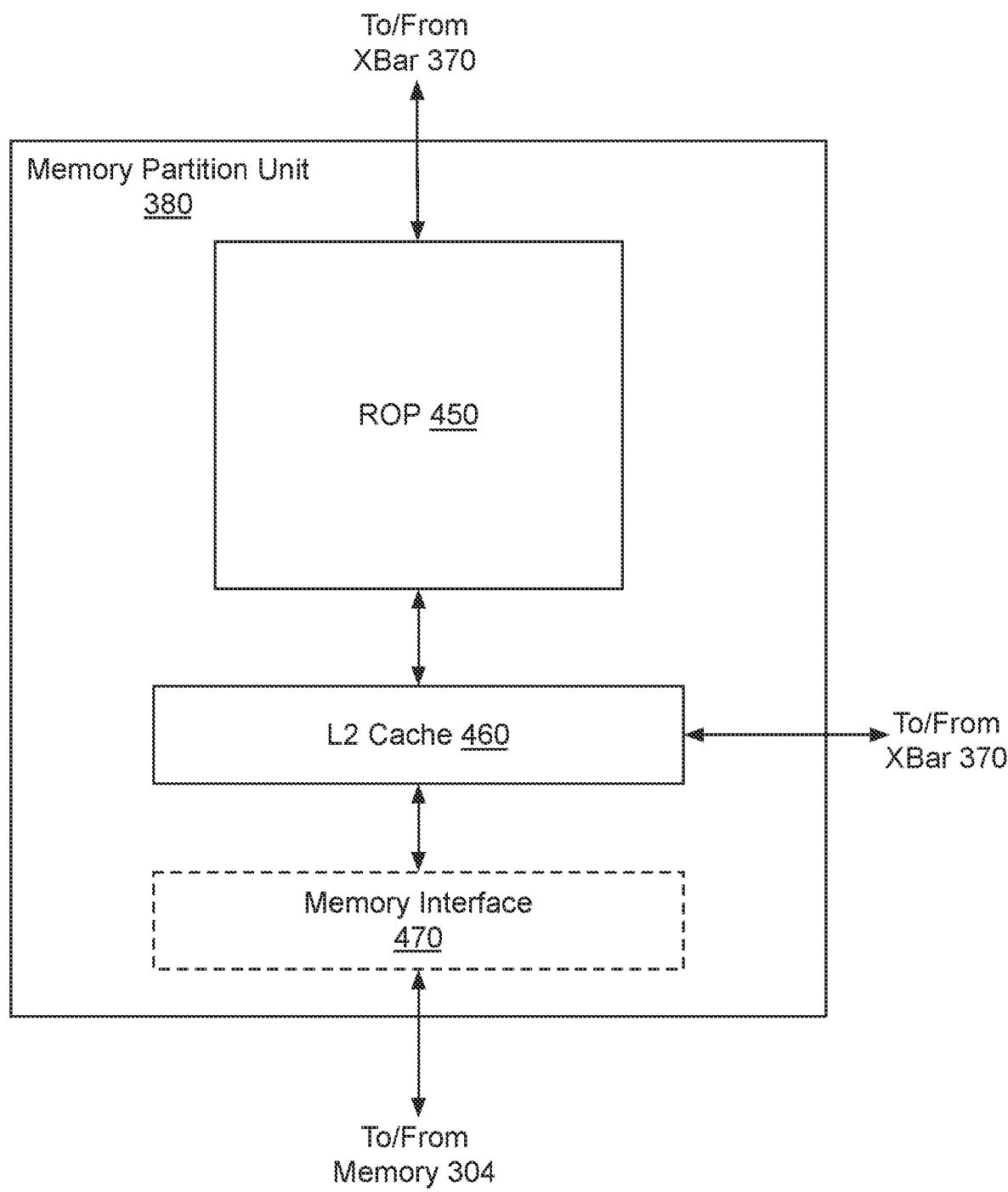
FIG. 4B illustrates a memory partition unit of the parallel processing unit of FIG. 3, in accordance with an embodiment.

The PROP unit 415 is configured to route data generated by the raster engine 425 and the DPCs 420 to a Raster Operations (ROP) unit, described in more detail in conjunction with FIG. 4B. The PROP unit 415 may also be configured to perform optimizations for color blending, organize pixel data, perform address translations, and the like.

The raster engine 425 includes a number of fixed function hardware units configured to perform various raster operations. In an embodiment, the raster engine 425 includes a setup engine, a coarse raster engine, a culling engine, a clipping engine, a fine raster engine, and a tile coalescing engine. The setup engine receives transformed vertices and generates plane equations associated with the geometric primitive defined by the vertices. The plane equations are transmitted to the coarse raster engine to generate coverage information (e.g., an x,y coverage mask for a tile) for the primitive. The output of the coarse raster engine is transmitted to the culling engine where fragments associated with the primitive that fail a z-test are culled, and transmitted to a clipping engine where fragments lying outside a viewing frustum are clipped. Those fragments that survive clipping and culling may be passed to the fine raster engine to generate attributes for the pixel fragments based on the plane equations generated by the setup engine. The output of the raster engine 425 comprises fragments to be processed, for example, by a fragment shader implemented within a DPC 420.

Each DPC 420 included in the GPC 350 includes an M-Pipe Controller (MPC) 430, a primitive engine 435, and one or more SMs 440. The MPC 430 controls the operation of the DPC 420, routing packets received from the pipeline manager 410 to the appropriate units in the DPC 420. For example, packets associated with a vertex may be routed to the primitive engine 435, which is configured to fetch vertex attributes associated with the vertex from the memory 304. In contrast, packets associated with a shader program may be transmitted to the SM 440.

The SM 440 comprises a programmable streaming processor that is configured to process tasks represented by a number of threads. Each SM 440 is multi-threaded and configured to execute a plurality of threads (e.g., 32 threads) from a particular group of threads concurrently. In an embodiment, the SM 440 implements a SIMD (Single-Instruction, Multiple-Data) architecture where each thread in a group of threads (e.g., a warp) is configured to process a different set of data based on the same set of instructions. All threads in the group of threads execute the same instructions. In another embodiment, the SM 440 implements a SIMT (Single-Instruction, Multiple Thread) architecture where each thread in a group of threads is configured to process a different set of data based on the same set of instructions, but where individual threads in the group of threads are allowed to diverge during execution. In an embodiment, a program counter, call stack, and execution state is maintained for each warp, enabling concurrency between warps and serial execution within warps when threads within the warp diverge. In another embodiment, a program counter, call stack, and execution state is maintained for each individual thread, enabling equal concurrency between all threads, within and between warps. When execution state is maintained for each individual thread, threads executing the same instructions may be converged and executed in parallel for maximum efficiency. The SM 440 will be described in more detail below in conjunction with FIG. 5A.

The MMU 490 provides an interface between the GPC 350 and the memory partition unit 380. The MMU 490 may provide translation of virtual addresses into physical addresses, memory protection, and arbitration of memory requests. In an embodiment, the MMU 490 provides one or more translation lookaside buffers (TLBs) for performing translation of virtual addresses into physical addresses in the memory 304.

FIG. 4B illustrates a memory partition unit 380 of the PPU 300 of FIG. 3, in accordance with an embodiment. As shown in FIG. 4B, the memory partition unit 380 includes a Raster Operations (ROP) unit 450, a level two (L2) cache 460, and a memory interface 470. The memory interface 470 is coupled to the memory 304. Memory interface 470 may implement 32, 64, 128, 1024-bit data buses, or the like, for high-speed data transfer. In an embodiment, the PPU 300 incorporates one memory interface 470 per pair of memory partition units 380, where each pair of memory partition units 380 is connected to a corresponding memory device 304. For example, PPU 300 may be connected to up to Y memory devices 304, such as high bandwidth memory stacks or graphics double-data-rate, version 5, synchronous dynamic random access memory, or other types of persistent storage.

In an embodiment, the memory interface 470 implements an HBM2 memory interface and Y equals half U. In an embodiment, the HBM2 memory stacks are located on the same physical package as the PPU 300, providing substantial power and area savings compared with conventional GDDR5 SDRAM systems. In an embodiment, each HBM2 stack includes four memory dies and Y equals 4, with HBM2 stack including two 128-bit channels per die for a total of 8 channels and a data bus width of 1024 bits.

In an embodiment, the memory 304 supports Single-Error Correcting Double-Error Detecting (SECDED) Error Correction Code (ECC) to protect data. ECC provides higher reliability for compute applications that are sensitive to data corruption. Reliability is especially important in large-scale cluster computing environments where PPUs 300 process very large datasets and/or run applications for extended periods.

In an embodiment, the PPU 300 implements a multi-level memory hierarchy. In an embodiment, the memory partition unit 380 supports a unified memory to provide a single unified virtual address space for CPU and PPU 300 memory, enabling data sharing between virtual memory systems. In an embodiment the frequency of accesses by a PPU 300 to memory located on other processors is traced to ensure that memory pages are moved to the physical memory of the PPU 300 that is accessing the pages more frequently. In an embodiment, the NVLink 310 supports address translation services allowing the PPU 300 to directly access a CPU's page tables and providing full access to CPU memory by the PPU 300.

In an embodiment, copy engines transfer data between multiple PPUs 300 or between PPUs 300 and CPUs. The copy engines can generate page faults for addresses that are not mapped into the page tables. The memory partition unit 380 can then service the page faults, mapping the addresses into the page table, after which the copy engine can perform the transfer. In a conventional system, memory is pinned (e.g., non-pageable) for multiple copy engine operations between multiple processors, substantially reducing the available memory. With hardware page faulting, addresses can be passed to the copy engines without worrying if the memory pages are resident, and the copy process is transparent.

Data from the memory 304 or other system memory may be fetched by the memory partition unit 380 and stored in the L2 cache 460, which is located on-chip and is shared between the various GPCs 350. As shown, each memory partition unit 380 includes a portion of the L2 cache 460 associated with a corresponding memory device 304. Lower level caches may then be implemented in various units within the GPCs 350. For example, each of the SMs 440 may implement a level one (L1) cache. The L1 cache is private memory that is dedicated to a particular SM 440. Data from the L2 cache 460 may be fetched and stored in each of the L1 caches for processing in the functional units of the SMs 440. The L2 cache 460 is coupled to the memory interface 470 and the XBar 370.

The ROP unit 450 performs graphics raster operations related to pixel color, such as color compression, pixel blending, and the like. The ROP unit 450 also implements depth testing in conjunction with the raster engine 425, receiving a depth for a sample location associated with a pixel fragment from the culling engine of the raster engine 425. The depth is tested against a corresponding depth in a depth buffer for a sample location associated with the fragment. If the fragment passes the depth test for the sample location, then the ROP unit 450 updates the depth buffer and transmits a result of the depth test to the raster engine 425. It will be appreciated that the number of memory partition units 380 may be different than the number of GPCs 350 and, therefore, each ROP unit 450 may be coupled to each of the GPCs 350. The ROP unit 450 tracks packets received from the different GPCs 350 and determines which GPC 350 that a result generated by the ROP unit 450 is routed to through the Xbar 370. Although the ROP unit 450 is included within the memory partition unit 380 in FIG. 4B, in other embodiment, the ROP unit 450 may be outside of the memory partition unit 380. For example, the ROP unit 450 may reside in the GPC 350 or another unit.

Figure 5A:
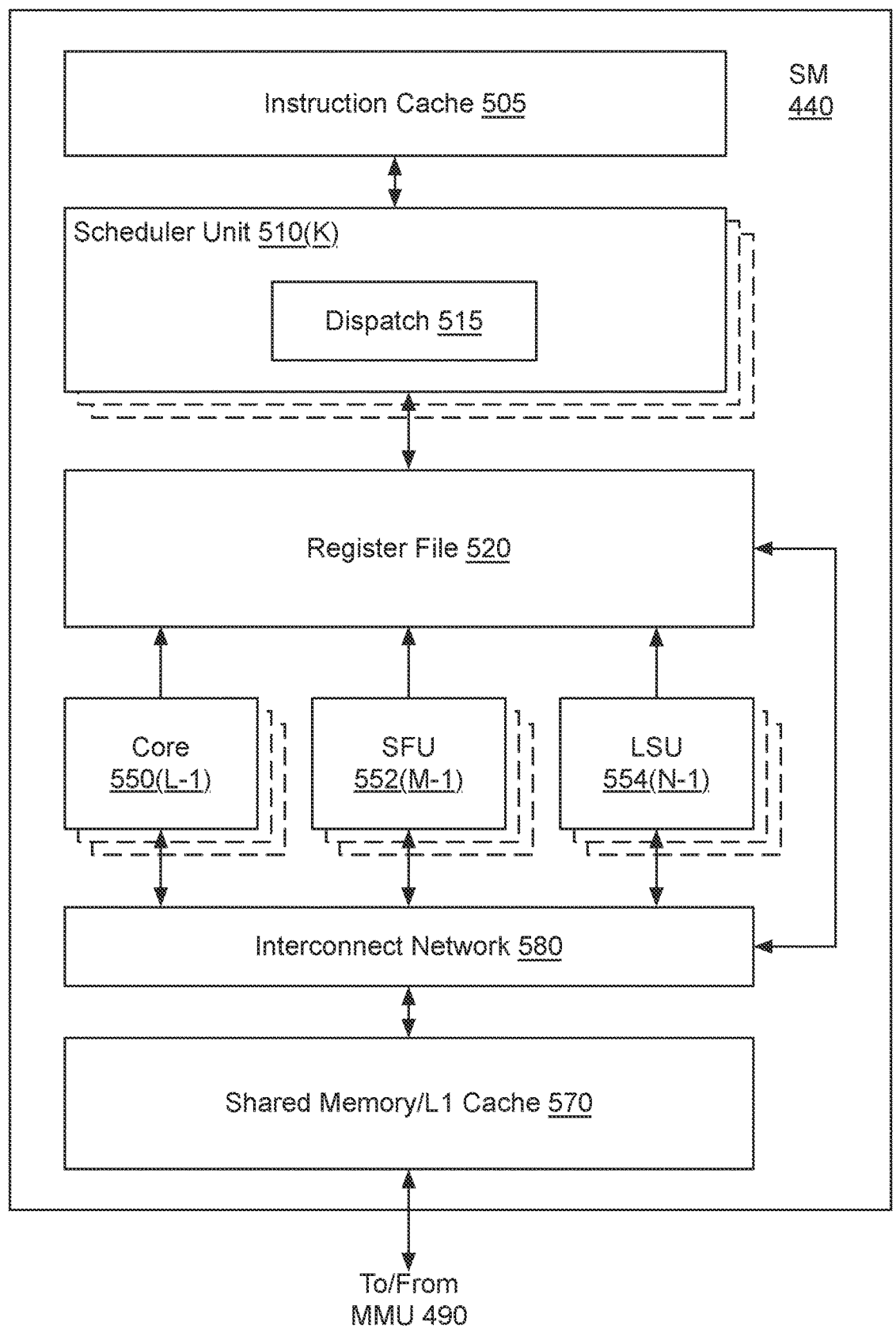
FIG. 5A illustrates the streaming multi-processor of FIG. 4A, in accordance with an embodiment.

FIG. 5A illustrates the streaming multi-processor 440 of FIG. 4A, in accordance with an embodiment. As shown in FIG. 5A, the SM 440 includes an instruction cache 505, one or more scheduler units 510, a register file 520, one or more processing cores 550, one or more special function units (SFUs) 552, one or more load/store units (LSUs) 554, an interconnect network 580, a shared memory/L1 cache 570.

As described above, the work distribution unit 325 dispatches tasks for execution on the GPCs 350 of the PPU 300. The tasks are allocated to a particular DPC 420 within a GPC 350 and, if the task is associated with a shader program, the task may be allocated to an SM 440. The scheduler unit 510 receives the tasks from the work distribution unit 325 and manages instruction scheduling for one or more thread blocks assigned to the SM 440. The scheduler unit 510 schedules thread blocks for execution as warps of parallel threads, where each thread block is allocated at least one warp. In an embodiment, each warp executes 32 threads. The scheduler unit 510 may manage a plurality of different thread blocks, allocating the warps to the different thread blocks and then dispatching instructions from the plurality of different cooperative groups to the various functional units (e.g., cores 550, SFUs 552, and LSUs 554) during each clock cycle.

Cooperative Groups is a programming model for organizing groups of communicating threads that allows developers to express the granularity at which threads are communicating, enabling the expression of richer, more efficient parallel decompositions. Cooperative launch APIs support synchronization amongst thread blocks for the execution of parallel algorithms. Conventional programming models provide a single, simple construct for synchronizing cooperating threads: a barrier across all threads of a thread block (e.g., the syncthreads( ) function). However, programmers would often like to define groups of threads at smaller than thread block granularities and synchronize within the defined groups to enable greater performance, design flexibility, and software reuse in the form of collective group-wide function interfaces.

Cooperative Groups enables programmers to define groups of threads explicitly at sub-block (e.g., as small as a single thread) and multi-block granularities, and to perform collective operations such as synchronization on the threads in a cooperative group. The programming model supports clean composition across software boundaries, so that libraries and utility functions can synchronize safely within their local context without having to make assumptions about convergence. Cooperative Groups primitives enable new patterns of cooperative parallelism, including producer-consumer parallelism, opportunistic parallelism, and global synchronization across an entire grid of thread blocks.

A dispatch unit 515 is configured to transmit instructions to one or more of the functional units. In the embodiment, the scheduler unit 510 includes two dispatch units 515 that enable two different instructions from the same warp to be dispatched during each clock cycle. In alternative embodiments, each scheduler unit 510 may include a single dispatch unit 515 or additional dispatch units 515.

Each SM 440 includes a register file 520 that provides a set of registers for the functional units of the SM 440. In an embodiment, the register file 520 is divided between each of the functional units such that each functional unit is allocated a dedicated portion of the register file 520. In another embodiment, the register file 520 is divided between the different warps being executed by the SM 440. The register file 520 provides temporary storage for operands connected to the data paths of the functional units.

Each SM 440 comprises L processing cores 550. In an embodiment, the SM 440 includes a large number (e.g., 128, etc.) of distinct processing cores 550. Each core 550 may include a fully-pipelined, single-precision, double-precision, and/or mixed precision processing unit that includes a floating point arithmetic logic unit and an integer arithmetic logic unit. In an embodiment, the floating point arithmetic logic units implement the IEEE 754-2008 standard for floating point arithmetic. In an embodiment, the cores 550 include 64 single-precision (32-bit) floating point cores, 64 integer cores, 32 double-precision (64-bit) floating point cores, and 8 tensor cores.

Tensor cores configured to perform matrix operations, and, in an embodiment, one or more tensor cores are included in the cores 550. In particular, the tensor cores are configured to perform deep learning matrix arithmetic, such as convolution operations for neural network training and inferencing. In an embodiment, each tensor core operates on a 4×4 matrix and performs a matrix multiply and accumulate operation D=A×B+C, where A, B, C, and D are 4×4 matrices.

In an embodiment, the matrix multiply inputs A and B are 16-bit floating point matrices, while the accumulation matrices C and D may be 16-bit floating point or 32-bit floating point matrices. Tensor Cores operate on 16-bit floating point input data with 32-bit floating point accumulation. The 16-bit floating point multiply requires 64 operations and results in a full precision product that is then accumulated using 32-bit floating point addition with the other intermediate products for a 4×4×4 matrix multiply. In practice, Tensor Cores are used to perform much larger two-dimensional or higher dimensional matrix operations, built up from these smaller elements. An API, such as CUDA 9 C++ API, exposes specialized matrix load, matrix multiply and accumulate, and matrix store operations to efficiently use Tensor Cores from a CUDA-C++ program. At the CUDA level, the warp-level interface assumes 16×16 size matrices spanning all 32 threads of the warp.

Each SM 440 also comprises M SFUs 552 that perform special functions (e.g., attribute evaluation, reciprocal square root, and the like). In an embodiment, the SFUs 552 may include a tree traversal unit configured to traverse a hierarchical tree data structure. In an embodiment, the SFUs 552 may include texture unit configured to perform texture map filtering operations. In an embodiment, the texture units are configured to load texture maps (e.g., a 2D array of texels) from the memory 304 and sample the texture maps to produce sampled texture values for use in shader programs executed by the SM 440. In an embodiment, the texture maps are stored in the shared memory/L1 cache 470. The texture units implement texture operations such as filtering operations using mip-maps (e.g., texture maps of varying levels of detail). In an embodiment, each SM 340 includes two texture units.

Each SM 440 also comprises NLSUs 554 that implement load and store operations between the shared memory/L1 cache 570 and the register file 520. Each SM 440 includes an interconnect network 580 that connects each of the functional units to the register file 520 and the LSU 554 to the register file 520, shared memory/L1 cache 570. In an embodiment, the interconnect network 580 is a crossbar that can be configured to connect any of the functional units to any of the registers in the register file 520 and connect the LSUs 554 to the register file and memory locations in shared memory/L1 cache 570.

The shared memory/L1 cache 570 is an array of on-chip memory that allows for data storage and communication between the SM 440 and the primitive engine 435 and between threads in the SM 440. In an embodiment, the shared memory/L1 cache 570 comprises 128 KB of storage capacity and is in the path from the SM 440 to the memory partition unit 380. The shared memory/L1 cache 570 can be used to cache reads and writes. One or more of the shared memory/L1 cache 570, L2 cache 460, and memory 304 are backing stores.

Combining data cache and shared memory functionality into a single memory block provides the best overall performance for both types of memory accesses. The capacity is usable as a cache by programs that do not use shared memory. For example, if shared memory is configured to use half of the capacity, texture and load/store operations can use the remaining capacity. Integration within the shared memory/L1 cache 570 enables the shared memory/L1 cache 570 to function as a high-throughput conduit for streaming data while simultaneously providing high-bandwidth and low-latency access to frequently reused data.

When configured for general purpose parallel computation, a simpler configuration can be used compared with graphics processing. Specifically, the fixed function graphics processing units shown in FIG. 3, are bypassed, creating a much simpler programming model. In the general purpose parallel computation configuration, the work distribution unit 325 assigns and distributes blocks of threads directly to the DPCs 420. The threads in a block execute the same program, using a unique thread ID in the calculation to ensure each thread generates unique results, using the SM 440 to execute the program and perform calculations, shared memory/L1 cache 570 to communicate between threads, and the LSU 554 to read and write global memory through the shared memory/L1 cache 570 and the memory partition unit 380. When configured for general purpose parallel computation, the SM 440 can also write commands that the scheduler unit 320 can use to launch new work on the DPCs 420.

The PPU 300 may be included in a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, and the like. In an embodiment, the PPU 300 is embodied on a single semiconductor substrate. In another embodiment, the PPU 300 is included in a system-on-a-chip (SoC) along with one or more other devices such as additional PPUs 300, the memory 204, a reduced instruction set computer (RISC) CPU, a memory management unit (MMU), a digital-to-analog converter (DAC), and the like.

In an embodiment, the PPU 300 may be included on a graphics card that includes one or more memory devices 304. The graphics card may be configured to interface with a PCIe slot on a motherboard of a desktop computer. In yet another embodiment, the PPU 300 may be an integrated graphics processing unit (iGPU) or parallel processor included in the chipset of the motherboard.

Exemplary Computing System

Systems with multiple GPUs and CPUs are used in a variety of industries as developers expose and leverage more parallelism in applications such as artificial intelligence computing. High-performance GPU-accelerated systems with tens to many thousands of compute nodes are deployed in data centers, research facilities, and supercomputers to solve ever larger problems. As the number of processing devices within the high-performance systems increases, the communication and data transfer mechanisms need to scale to support the increased bandwidth.

Figure 5B:
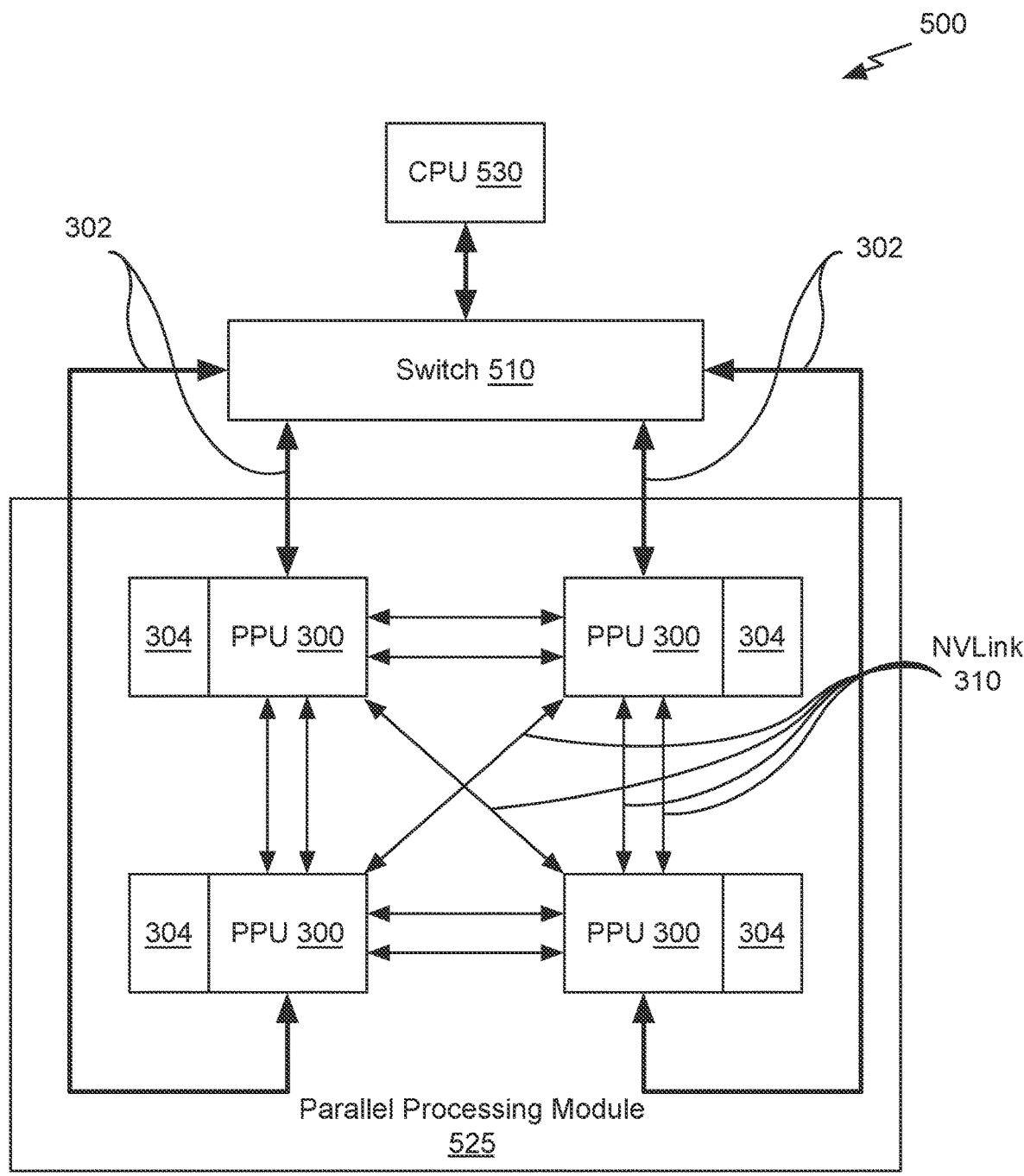
FIG. 5B is a conceptual diagram of a processing system implemented using the PPU of FIG. 3, in accordance with an embodiment.

FIG. 5B is a conceptual diagram of a processing system 500 implemented using the PPU 300 of FIG. 3, in accordance with an embodiment. The exemplary system 565 may be configured to implement the method 150 shown in FIG. 1D and the method 225 shown in FIG. 2B. The processing system 500 includes a CPU 530, switch 510, and multiple PPUs 300 each and respective memories 304. The NVLink 310 provides high-speed communication links between each of the PPUs 300. Although a particular number of NVLink 310 and interconnect 302 connections are illustrated in FIG. 5B, the number of connections to each PPU 300 and the CPU 530 may vary. The switch 510 interfaces between the interconnect 302 and the CPU 530. The PPUs 300, memories 304, and NVLinks 310 may be situated on a single semiconductor platform to form a parallel processing module 525. In an embodiment, the switch 510 supports two or more protocols to interface between various different connections and/or links.

In another embodiment (not shown), the NVLink 310 provides one or more high-speed communication links between each of the PPUs 300 and the CPU 530 and the switch 510 interfaces between the interconnect 302 and each of the PPUs 300. The PPUs 300, memories 304, and interconnect 302 may be situated on a single semiconductor platform to form a parallel processing module 525. In yet another embodiment (not shown), the interconnect 302 provides one or more communication links between each of the PPUs 300 and the CPU 530 and the switch 510 interfaces between each of the PPUs 300 using the NVLink 310 to provide one or more high-speed communication links between the PPUs 300. In another embodiment (not shown), the NVLink 310 provides one or more high-speed communication links between the PPUs 300 and the CPU 530 through the switch 510. In yet another embodiment (not shown), the interconnect 302 provides one or more communication links between each of the PPUs 300 directly. One or more of the NVLink 310 high-speed communication links may be implemented as a physical NVLink interconnect or either an on-chip or on-die interconnect using the same protocol as the NVLink 310.

In the context of the present description, a single semiconductor platform may refer to a sole unitary semiconductor-based integrated circuit fabricated on a die or chip. It should be noted that the term single semiconductor platform may also refer to multi-chip modules with increased connectivity which simulate on-chip operation and make substantial improvements over utilizing a conventional bus implementation. Of course, the various circuits or devices may also be situated separately or in various combinations of semiconductor platforms per the desires of the user. Alternately, the parallel processing module 525 may be implemented as a circuit board substrate and each of the PPUs 300 and/or memories 304 may be packaged devices. In an embodiment, the CPU 530, switch 510, and the parallel processing module 525 are situated on a single semiconductor platform.

In an embodiment, the signaling rate of each NVLink 310 is 20 to 25 Gigabits/second and each PPU 300 includes six NVLink 310 interfaces (as shown in FIG. 5B, five NVLink 310 interfaces are included for each PPU 300). Each NVLink 310 provides a data transfer rate of 25 Gigabytes/second in each direction, with six links providing 300 Gigabytes/second. The NVLinks 310 can be used exclusively for PPU-to-PPU communication as shown in FIG. 5B, or some combination of PPU-to-PPU and PPU-to-CPU, when the CPU 530 also includes one or more NVLink 310 interfaces.

In an embodiment, the NVLink 310 allows direct load/store/atomic access from the CPU 530 to each PPU's 300 memory 304. In an embodiment, the NVLink 310 supports coherency operations, allowing data read from the memories 304 to be stored in the cache hierarchy of the CPU 530, reducing cache access latency for the CPU 530. In an embodiment, the NVLink 310 includes support for Address Translation Services (ATS), allowing the PPU 300 to directly access page tables within the CPU 530. One or more of the NVLinks 310 may also be configured to operate in a low-power mode.

Figure 5C:
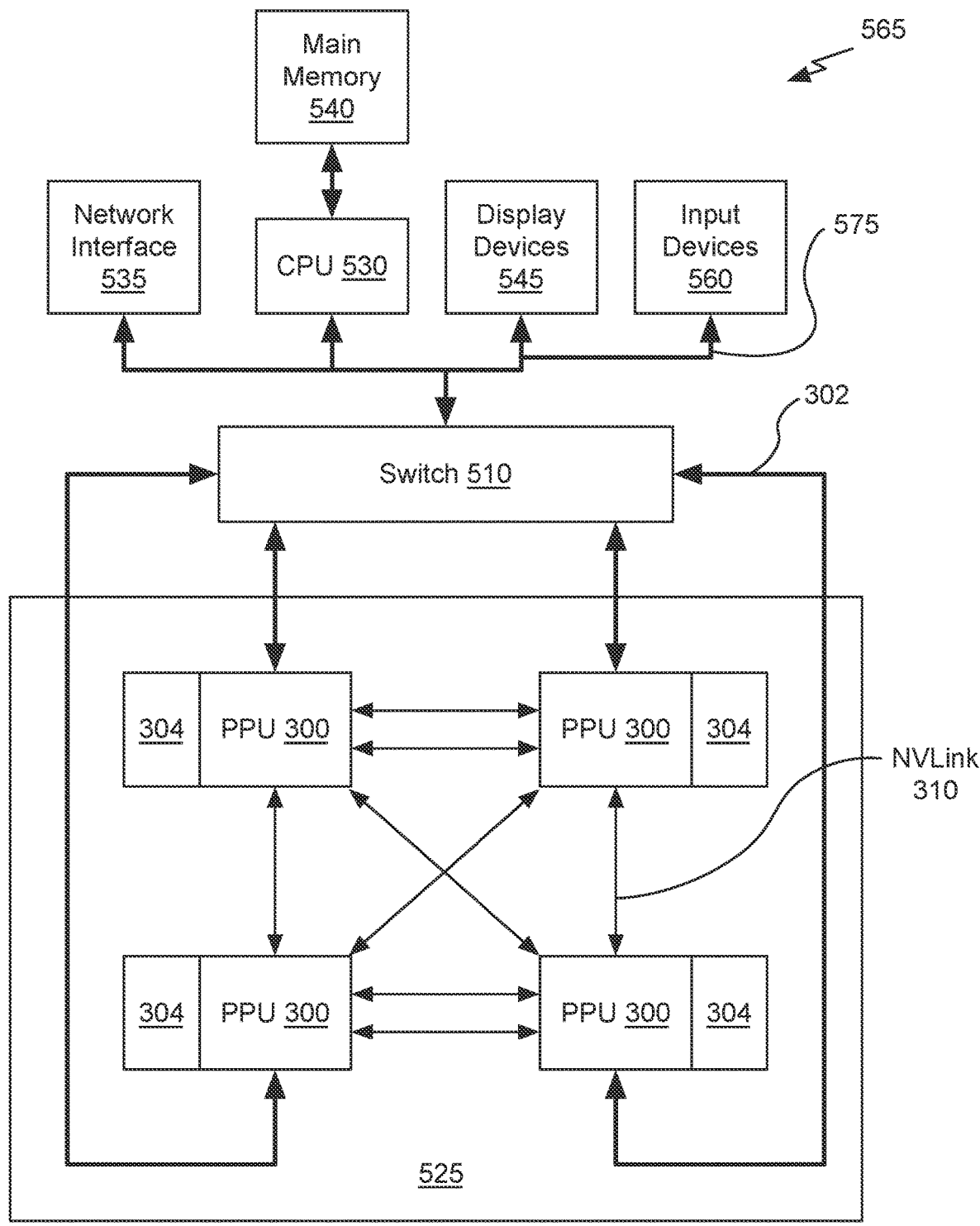
FIG. 5C illustrates an exemplary system in which the various architecture and/or functionality of the various previous embodiments may be implemented.

FIG. 5C illustrates an exemplary system 565 in which the various architecture and/or functionality of the various previous embodiments may be implemented. The exemplary system 565 may be configured to implement the method 150 shown in FIG. 1D and the method 225 shown in FIG. 2B.

As shown, a system 565 is provided including at least one central processing unit 530 that is connected to a communication bus 575. The communication bus 575 may be implemented using any suitable protocol, such as PCI (Peripheral Component Interconnect), PCI-Express, AGP (Accelerated Graphics Port), HyperTransport, or any other bus or point-to-point communication protocol(s). The system 565 also includes a main memory 540. Control logic (software) and data are stored in the main memory 540 which may take the form of random access memory (RAM).

The system 565 also includes input devices 560, the parallel processing system 525, and display devices 545, e.g. a conventional CRT (cathode ray tube), LCD (liquid crystal display), LED (light emitting diode), plasma display or the like. User input may be received from the input devices 560, e.g., keyboard, mouse, touchpad, microphone, and the like.

Each of the foregoing modules and/or devices may even be situated on a single semiconductor platform to form the system 565. Alternately, the various modules may also be situated separately or in various combinations of semiconductor platforms per the desires of the user.

Further, the system 565 may be coupled to a network (e.g., a telecommunications network, local area network (LAN), wireless network, wide area network (WAN) such as the Internet, peer-to-peer network, cable network, or the like) through a network interface 535 for communication purposes.

The system 565 may also include a secondary storage (not shown). The secondary storage 610 includes, for example, a hard disk drive and/or a removable storage drive, representing a floppy disk drive, a magnetic tape drive, a compact disk drive, digital versatile disk (DVD) drive, recording device, universal serial bus (USB) flash memory. The removable storage drive reads from and/or writes to a removable storage unit in a well-known manner.

Computer programs, or computer control logic algorithms, may be stored in the main memory 540 and/or the secondary storage. Such computer programs, when executed, enable the system 565 to perform various functions. The memory 540, the storage, and/or any other storage are possible examples of computer-readable media.

The architecture and/or functionality of the various previous figures may be implemented in the context of a general computer system, a circuit board system, a game console system dedicated for entertainment purposes, an application-specific system, and/or any other desired system. For example, the system 565 may take the form of a desktop computer, a laptop computer, a tablet computer, servers, supercomputers, a smart-phone (e.g., a wireless, hand-held device), personal digital assistant (PDA), a digital camera, a vehicle, a head mounted display, a hand-held electronic device, a mobile phone device, a television, workstation, game consoles, embedded system, and/or any other type of logic.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

Machine Learning

Deep neural networks (DNNs) developed on processors, such as the PPU 300 have been used for diverse use cases, from self-driving cars to faster drug development, from automatic image captioning in online image databases to smart real-time language translation in video chat applications. Deep learning is a technique that models the neural learning process of the human brain, continually learning, continually getting smarter, and delivering more accurate results more quickly over time. A child is initially taught by an adult to correctly identify and classify various shapes, eventually being able to identify shapes without any coaching. Similarly, a deep learning or neural learning system needs to be trained in object recognition and classification for it get smarter and more efficient at identifying basic objects, occluded objects, etc., while also assigning context to objects.

At the simplest level, neurons in the human brain look at various inputs that are received, importance levels are assigned to each of these inputs, and output is passed on to other neurons to act upon. An artificial neuron or perceptron is the most basic model of a neural network. In one example, a perceptron may receive one or more inputs that represent various features of an object that the perceptron is being trained to recognize and classify, and each of these features is assigned a certain weight based on the importance of that feature in defining the shape of an object.

A deep neural network (DNN) model includes multiple layers of many connected nodes (e.g., perceptrons, Boltzmann machines, radial basis functions, convolutional layers, etc.) that can be trained with enormous amounts of input data to quickly solve complex problems with high accuracy. In one example, a first layer of the DNN model breaks down an input image of an automobile into various sections and looks for basic patterns such as lines and angles. The second layer assembles the lines to look for higher level patterns such as wheels, windshields, and mirrors. The next layer identifies the type of vehicle, and the final few layers generate a label for the input image, identifying the model of a specific automobile brand.

Once the DNN is trained, the DNN can be deployed and used to identify and classify objects or patterns in a process known as inference. Examples of inference (the process through which a DNN extracts useful information from a given input) include identifying handwritten numbers on checks deposited into ATM machines, identifying images of friends in photos, delivering movie recommendations to over fifty million users, identifying and classifying different types of automobiles, pedestrians, and road hazards in driverless cars, or translating human speech in real-time.

During training, data flows through the DNN in a forward propagation phase until a prediction is produced that indicates a label corresponding to the input. If the neural network does not correctly label the input, then errors between the correct label and the predicted label are analyzed, and the weights are adjusted for each feature during a backward propagation phase until the DNN correctly labels the input and other inputs in a training dataset. Training complex neural networks requires massive amounts of parallel computing performance, including floating-point multiplications and additions that are supported by the PPU 300. Inferencing is less compute-intensive than training, being a latency-sensitive process where a trained neural network is applied to new inputs it has not seen before to classify images, translate speech, and generally infer new information.

Neural networks rely heavily on matrix math operations, and complex multi-layered networks require tremendous amounts of floating-point performance and bandwidth for both efficiency and speed. With thousands of processing cores, optimized for matrix math operations, and delivering tens to hundreds of TFLOPS of performance, the PPU 300 is a computing platform capable of delivering performance required for deep neural network-based artificial intelligence and machine learning applications.

What is claimed is:

1. A computer-implemented method, comprising:
   receiving locations of keypoints for a three-dimensional (3D) object, wherein each location includes pixel coordinates and a normalized depth value, the pixel coordinates corresponding to pixels within a two-dimensional (2D) image of the 3D object, the 2D image associated with camera attributes and the normalized depth values corresponding to normalized relative depth values of each one of the keypoints with respect to a reference keypoint;
   computing a depth of the reference keypoint with respect to a camera based on the locations and the camera attributes; and
   computing a scale normalized 3D pose of the 3D object based on the locations, the depth of the reference keypoint and the camera attributes.

2. The computer-implemented method of claim 1, further comprising receiving a scale factor corresponding to the 3D object.

3. The computer-implemented method of claim 2, further comprising generating, according to the scale factor, an absolute 3D pose of the 3D object from the scale normalized 3D pose.

4. The computer-implemented method of claim 2, wherein the scale factor is estimated and corresponds to a component of the 3D object.

5. The computer-implemented method of claim 2, wherein the scale factor is measured and corresponds to a component of the 3D object.

6. The computer-implemented method of claim 2, wherein the scale factor is a distance between two vertices or two keypoints of the 3D object.

7. The computer-implemented method of claim 1, wherein the normalized depth values are computed relative to a reference keypoint.

8. The computer-implemented method of claim 7, wherein computing the scale normalized 3D pose is based on a depth of the reference keypoint that is calculated using the locations.

9. The computer-implemented method of claim 1, wherein the normalized depth values are invariant for changes in a scale of the 3D object.

10. The computer-implemented method of claim 1, wherein the normalized depth values are invariant for changes in a translation of the 3D object.

11. A system, comprising:
    a processor configured to:
    receive locations of keypoints for a three-dimensional (3D) object, wherein each location includes pixel coordinates and a normalized depth value, the pixel coordinates corresponding to pixels within a two-dimensional (2D) image of the 3D object, the 2D image associated with camera attributes and the normalized depth values corresponding to normalized relative depth values of each one of the keypoints with respect to a reference keypoint;
    compute a depth of the reference keypoint with respect to a camera based on the locations and the camera attributes; and
    compute a scale normalized 3D pose of the 3D object based on the locations, the depth of the reference keypoint and the camera attributes.

12. The system of claim 11, wherein the processor is further configured to receive a scale factor corresponding to the 3D object.

13. The system of claim 12, wherein the processor is further configured to generate, according to the scale factor, an absolute 3D pose of the 3D object from the scale normalized 3D pose.

14. The system of claim 12, wherein the scale factor is estimated and corresponds to a component of the 3D object.

15. The system of claim 12, wherein the scale factor is a distance between two vertices or two keypoints of the 3D object.

16. The system of claim 11, wherein the normalized depth values are computed relative to a reference keypoint.

17. The system of claim 16, wherein computing the scale normalized 3D pose is based on a depth of the reference keypoint that is calculated using the locations.

18. A non-transitory computer-readable media storing computer instructions that, when executed by one or more processors, cause the one or more processors to perform the steps of:

receiving locations of keypoints for a three-dimensional (3D) object, wherein each location includes pixel coordinates and a normalized depth value, the pixel coordinates corresponding to pixels within a two-dimensional (2D) image of the 3D object, the 2D image associated with camera attributes and the normalized depth values corresponding to normalized relative depth values of each one of the keypoints with respect to a reference keypoint;

computing a depth of the reference keypoint with respect to a camera based on the locations and the camera attributes; and computing a scale normalized 3D pose of the 3D object based on the locations, the depth of the reference keypoint and the camera attributes.

19. The non-transitory computer-readable media of claim 18, further comprising receiving a constant scale factor corresponding to the 3D object.

20. The non-transitory computer-readable media of claim 19, further comprising generating, according to a scale factor, an absolute 3D pose of the 3D object from the scale normalized 3D pose.

* * * * *